United States Patent
Messiou et al.

(10) Patent No.: US 10,253,466 B2
(45) Date of Patent: Apr. 9, 2019

(54) GROUND LEVEL ILLUMINATION SYSTEM

(71) Applicant: Cyclops Road Studs Limited, Lynton, Devon (GB)

(72) Inventors: Antoine Yvon Messiou, Leicester (GB); Thomas James Barker, Barnstaple (GB)

(73) Assignee: Cyclops Road Studs Limited, Lynton, Devon (GB)

( * ) Notice: Subject to any disclaimer, the term of this patent is extended or adjusted under 35 U.S.C. 154(b) by 0 days.

(21) Appl. No.: 15/329,038

(22) PCT Filed: May 28, 2015

(86) PCT No.: PCT/GB2015/051561
§ 371 (c)(1),
(2) Date: Jan. 25, 2017

(87) PCT Pub. No.: WO2016/016604
PCT Pub. Date: Feb. 4, 2016

(65) Prior Publication Data
US 2017/0211247 A1    Jul. 27, 2017

(30) Foreign Application Priority Data
Jul. 28, 2014   (GB) .................................. 1413325.0

(51) Int. Cl.
*F21S 13/10*   (2006.01)
*E01F 9/559*   (2016.01)
(Continued)

(52) U.S. Cl.
CPC .............. *E01F 9/559* (2016.02); *B64F 1/205* (2013.01); *F21S 8/022* (2013.01); *F21S 9/02* (2013.01);
(Continued)

(58) Field of Classification Search
CPC ... E01F 9/559; F21S 9/02; F21S 8/022; F21V 5/02; F21V 7/04; F21V 21/06; F21W 2111/06; F21W 2111/08
(Continued)

(56) References Cited

U.S. PATENT DOCUMENTS 3,327,104 A   6/1967   Loch
3,610,912 A * 10/1971  Schwartz ................ B64F 1/205
                                                                362/261
(Continued)

FOREIGN PATENT DOCUMENTS

DE        29723372 U1    8/1998
EP         1281021 A1    2/2003
(Continued)

OTHER PUBLICATIONS

International Search Report, Form PCT/ISA/210, dated Aug. 27, 2015, for PCT/GB2015/051561, 4 pages.
(Continued)

*Primary Examiner* — Anh T Mai
*Assistant Examiner* — Matthew J. Peerce
(74) *Attorney, Agent, or Firm* — Kilyk & Bowersox, P.L.L.C.

(57) ABSTRACT

A ground level illumination system such as a road stud comprises a light source (12) positioned below ground level (8). An optics block (9) and a top block (2) transmit light from the source (12) to the exterior, the light rising at a shallow angle as a collimated beam in the top block (2) to emerge at a window (4) above the ground level (8). The window (4) is shaped to refract the light into a beam (16) that descends at a shallow angle relative to the ground level (8). The emerging beam (16) may be used to illuminate road markings (26) formed from luminous paint that can be re-charged by the illumination system. A feedback mecha-
(Continued)

nism (82) can measure reflected light levels to maintain the optimal "charge" in the paint. A further element (84) of the system may also compare the intensity of reflected light at different wavelengths to detect the presence of fog.

20 Claims, 17 Drawing Sheets

(51) Int. Cl.
*B64F 1/20* (2006.01)
*F21S 8/02* (2006.01)
*F21S 9/02* (2006.01)
*F21V 5/02* (2006.01)
*F21V 7/04* (2006.01)
*G02B 27/30* (2006.01)

(52) U.S. Cl.
CPC ............. *F21V 5/02* (2013.01); *F21V 7/04* (2013.01); *G02B 27/30* (2013.01); *B64D 2203/00* (2013.01)

(58) Field of Classification Search
USPC ........................................................ 362/363
See application file for complete search history.

(56) References Cited

U.S. PATENT DOCUMENTS

| | | | |
|---|---|---|---|
| 5,105,347 A * | 4/1992 | Ruud | ............... F21S 8/083 362/153.1 |
| 2011/0058364 A1 | 3/2011 | McDermott | |

FOREIGN PATENT DOCUMENTS

| | | |
|---|---|---|
| EP | 1647633 A1 | 4/2006 |
| GB | 1256946 A | 12/1971 |
| JP | 2014002962 A | 1/2014 |
| WO | 0186198 A1 | 11/2001 |
| WO | 03027397 A1 | 4/2003 |

OTHER PUBLICATIONS

Written Opinion of the International Searching Authority, Form PCT/ISA/237, dated Aug. 27, 2015, for PCT/GB2015/051561, 6 pages.

Search Report for Application No. GB1413325.0, published by the UK Intellectual Property Office, date of search Dec. 10, 2014.

* cited by examiner

GROUND LEVEL ILLUMINATION SYSTEM

FIELD OF THE INVENTION

The present invention relates to a compact and robust ground level illumination system such as a road stud that provides well defined illumination for a substantially horizontal receiving plane. The divergence of the illuminating rays in the vertical direction is controlled such that the light is incident on a pre-defined area on the ground plane. When the system is employed at night or in low light level conditions on a pathway it provides additional safety to the user of the pathway. The system can thus be beneficially employed on pathways used by pedestrians, cyclists and vehicles, especially road vehicles. The system may also be employed to illuminate aircraft runways.

BACKGROUND

Authorities, planners and designers are concerned with providing safer systems for transport with an aim to avoiding injury and death of road users.

For example there is great concern with reducing the numbers of accidents that occur on roads. Legislators are constantly aiming to improve vehicle safety and there is a trend to focus on road safety including signs, layout and lighting.

Additionally procedures tend towards sustainability and cost awareness. A cost effective means of providing safety on roads, highways and runways, or indeed pedestrian walkways is to provide lighting.

In particular given most vehicles provide their own lighting for a number of years retro-reflectors such as those known as "cats-eyes" have provided a cost-effective, efficient and simple means of lighting paths so as to indicate. These provide a passive reflector that is mounted in the road and reflects incident light from a vehicle headlamp. (CATSEYE is acknowledged as a registered trade mark.)

However, even with such reflectors sometimes roads can be hazardous for drivers, especially at sharp bends or curves and they only provide limited illumination levels.

Another disadvantage is that traditional "cats eye" road studs are only active when incident light from a vehicle headlamp is reflected to the driver and for this to occur the vehicle has to be relatively close to the "cats eye" road stud with direct line of sight from the vehicle headlamp to the "cats eye" road stud and from the "cats eye" road stud to the driver. The light reflected back from a cats eye does not effectively illuminate the road surface because the light is reflected back to the source of light, that is the headlamp. Therefore with such traditional "cats eye" road studs there is often no way that a driver can judge the lie of the road further ahead than the vehicle headlamp can illuminate.

PRIOR ART

A number of patent applications have been filed in respect of devices which have attempted to resolve the problem, including the following:

U.S. patent application U.S. Pat. No. 2007 297 805 (Rabinovich) discloses an optical communication system comprising: a first terminal having a transmitter for transmitting an interrogating light beam and a receiver for receiving the interrogating light beam. A second terminal has a cats-eye modulating retro-reflector (MRR) assembly, which includes a cats-eye MRR, wherein the cats-eye MRR includes a modulator for modulating the interrogating light beam received from the transmitter.

An optical focusing device focuses the interrogating light beam from the transmitter to the modulator and a reflector reflects the modulated light beam to the receiver. The cat's eye MRR assembly further includes a beam deflector positioned at an optical aperture of the cat's eye MRR to coarsely deflect the interrogating light beam from the transmitter to the focusing device of the cats-eye MRR.

Korean patent application KR 2005 0 006 031 (Kim) discloses a road stud for increasing the reflective brightness of a reflector and to reduce the manufacturing cost by using a solid reflector which is easy to manufacture. The road stud contains: an anchor buried under the road; a head installed on the anchor to be projected to the road surface; and a reflector composed of a fixed plate attached to the side of the head. Several reflection units are provided on the fixed plate and planes reflect the light. The reflector is made with light transmissible materials, such as glass or transparent synthetic resin, and mixed with pigments to light up in a specific colour if necessary.

Granted European patent EP 1 281 021 (Rizkin et al) discloses a light transformer for directing light from a light source with low divergence or substantially parallel with an axis of light direction. The device comprises: a first end for receiving light from the light source; a second end for outputting the received light, the second end located on an opposite end of the device from the first end; a first member located on a third end of the device; and a first planar optical window located at an end of the first member.

The first planar optical window is substantially perpendicular to the axis of the light direction, wherein the first member has an outer wall comprising a total internal reflection surface for reflecting received light through the first planar optical window in a direction with low divergence or substantially parallel to the axis of light direction.

Australian patent application AU 690 674 (Ishida) discloses a self-emission road stud comprising a body having a reduced-diameter bottom portion serving as a retaining leg and a top portion which is at least partially transparent, and a light source within the body for emitting light through the top portion.

United Kingdom patent application GB 494 297 (Barrs et al) discloses reflectors that are arranged in a straight line along a kerb or other edging of a road. The reflectors are so arranged that a beam of light from the headlamp of a car can pass from the outer edge of each reflector to the next adjacent reflector, in order to give the effect to the driver of a continuous band of light along the kerb.

Reflectors are mounted in a groove in a kerb and are illuminated by the headlamps of a car. The groove may be continuous or a series of grooves may be provided. The reflectors may be disposed at right-angles to the line of kerb or at an angle normal to the beam from the headlight. In a modification auxiliary reflecting surfaces are disposed on either side of the main reflectors.

United Kingdom patent application GB 485 940 (Mitchell) discloses that a top surface of a kerb or like road edging is formed to present a number of indentations or corrugations having reflecting surfaces which present a continuous or practically continuous strip of light to the driver of a vehicle. The indentations or corrugations may be formed in the material of the kerb or on members set into the kerb. In one construction, a tile having a metal reinforcement is set into the upper surface of the kerb with its upper reflecting face flush with the face of the kerb.

Whilst the aforementioned systems were of use in some situations, they suffer from drawbacks to the extent that they do not provide well defined and extended illumination over a pathway. In the case of Rizkin the key optical component (TIR optic) has to be completely above the level of the pathway to work effectively. To avoid possible impact damage from oncoming vehicles road studs must not extend much above the ground and must have a streamlined profile. The prior art arrangements, including Rizkin is thus disadvantageous. Those prior arrangements that are not high above ground level provide little by way of well defined and extended illumination on the pathway. By extended we mean illumination that extends over a length of pathway of around 1 meter or more.

TECHNICAL BACKGROUND TO THE INVENTION

At first glance it could be argued that simply shrinking all the optical components in arrangements such as Rizkin could solve the issue of compactness and robustness whilst maintaining a well defined extended beam, however, there are practical and fundamental optical reasons why this is not the case.

The following discussion will provide an explanation as to why simply reducing the scale of the optics does not provide an effective ground level illuminator. Such discussions will be referenced to a number of conditions relevant to ground level illumination.

Firstly the angle of incidence of any illuminating rays are de facto shallow, i.e. at extremely oblique angles. Because of the extremely oblique incidence on the receiving plane the use of high lumen light sources that are required to achieve readily visible illumination that is to provide sufficient lux values. Typically values of several lux or greater are required at night on the ground. LEDs are increasingly the favoured light source and high lumen LEDs typically have wide angular distribution (typically >100 degrees). This fact immediately implies that any collection optic must gather light over an input angle of 100 degrees. Producing a low f-number optic (including non-imaging concentrator optics which may be characterised as having an equivalent to an f-number) is technically challenging. In addition, to produce a beam of low divergence, the effective focal length of the collecting optic must be much greater than the source size. In summary, with conventional optical arrangements f (the focal length) must be long and if f-number is sufficiently low to collect 100 degrees of light a large, long optic is required. These arguments indicate that having a collimating lens entirely above ground level for the purpose of ground level illumination results in a relatively high, large optic which is disadvantageous.

In addition, the requirement for robustness means that discrete optics which have an air space between them or between the source and the optic are potential points of mechanical weakness. Any air spaces within optics are not a source of mechanical weakness if they are located directly below a thick solid piece of robust, protective material.

The theory and assumptions for determining the shape of an optical surface from the incident and refracted wavefronts of a pencil of rays incident on the surface is presented. Specifically we require the shape of refracting surface S required to substantially collimate rays from points on a source surface $S_0$. In addition the crucial situation of interest that relates to the current invention is when the emergent rays are collimated and the ray bundle is refracted at large angles. This condition is occurs just outside the TIR (total internal reflection) condition. For clarity in the analysis, primarily simple and principal rays will be discussed. Because of the finite size of the source, particularly one such as a high lumen power LED source, the real rays will be much more complicated and include many spurious rays. In effect the LEDs act as a multiplicity of point sources, displaced from one another. Therefore the direction of collimated rays originating from each point source will vary and the total bundle of rays will therefore diverge somewhat. Because actual rays from an LED are well characterised by measurement and may be imported into optical simulation programs as a ray data file all the real characteristics of the rays including spurious rays are taken account of in the modelling, design and optimisation so that an effective refractive surface is obtained. This surface will naturally be somewhat different to the predictions of this subsequent theoretical analysis.

As will be explained below the theory also applies where S is a reflective surface. For the purposes of explaining the theory we will concentrate on refracting surfaces. The optical configuration is illustrated in plan and side view in FIG. 24 where the axis of symmetry is parallel to the y-axis of the xyz Cartesian frame indicated. The source and refracting surfaces are labelled $S_0$ and S.

A good starting point for such an analysis is the Coddington theory developed for the analysis of astigmatic imaging. The Coddington equations are usually defined as follows:

$$n_r/s_r - n_i/s_i = (n_r \cos \theta_r - n_i \cos \theta_i)/r_s \qquad (1)$$

$$n_r \cos^2 \theta_r/t_r - n_i \cos^2 \theta_i/t_i = (n_r \cos \theta_r - n_i \cos \theta_i)/r_t \qquad (2)$$

where $\theta_r$ and $\theta_i$ are the angles of refraction and incidence of a meridional ray refracted by a surface with local principal radii of curvature $r_s$ and $r_t$. The refractive surface separates media of refractive indices $n_i$ and $n_r$. The distances $s_r$ and $s_i$ are the conjugate distances along the ray to and from the surface vertex, respectively for the meridional plane, where the subscripts i and r refer to incident and refracted (or reflected) rays. The distance $t_r$ and $t_i$ are the conjugate distances along the ray to and from the surface vertex, respectively for the tangential plane. For the purposes of the present analysis we require a more generalized description of the surface curvature and wavefront shapes. Our analysis will therefore be based on the generalized Coddington equations which are well documented in the technical literature (Blendowske R., "Oblique Central Refraction in Tilted Spherocylindrical Lenses", Optometry and Vision Science Vol. 79, No. 1, 2002).

In the first step of our analysis we assume that the surface and the incident and refracted wavelengths may be approximated by parabolic functions. Hence the equations for the incident and refracted wavefronts are:

$$W_i = x^2/2s_{ix} + xy/s_{ixy} + y^2/2s_{iy} \qquad (3)$$

$$W_r = x^2/2s_{rx} + xy/s_{rxy} + y^2/2s_{ry} \qquad (4)$$

The equation for the surface element S is:

$$S = X^2/2s_x + xy/s_{xy} + y^2/2s_y \qquad (5)$$

Note that the wavefronts and surface S are each defined by a local reference frame: xyz, for the surface S; and $x_iy_iz_i$ and $x_ry_rz_r$ for wavefronts $W_i$ and $W_r$ as shown in FIG. 25. In the following analysis we derive expressions for the coefficients $s_x$, $s_{xy}$ and $s_y$.

Referring to the geometry of FIG. 25 Coddington's generalised equations using surface area elements can be written as:

$$n_r R_r C_r R_r^{-1} - n_i R_i C_i R_i^{-1} = (n_r \cos \theta_r - n_i \cos \theta_i)C \qquad (6)$$

where $\theta_r$ and $\theta_i$ are the angles of refraction and incidence of a meridional ray as in equations (1) and (2), the terms $C_i$ and $C_r$ are the curvature matrices of the incident and refracted wavefronts, C is the curvature matrix of the surface element, $R_i$ and $R_r$ are rotation matrices for the incident and refracted beams and $n_i$ and $n_r$ are the refractive indices of the incident and refracted media.

Using a standard result from differential geometry, the curvature matrix for the surface element is given by:

$$C = \begin{vmatrix} \partial^2/\partial x^2 & \partial^2/\partial x \partial y \\ \partial^2/\partial x \partial y & \partial^2/\partial y^2 \end{vmatrix} \quad (7)$$

Using equations (3) and (4) the curvature matrix may be expressed as:

$$C = \begin{vmatrix} 1/s_x & 1/2s_{xy} \\ 1/2s_{xy} & 1/s_y \end{vmatrix} \quad (8)$$

The curvature matrices for the incident ($C_i$) and refracted ($C_r$) wavefronts may be derived in similar fashion using equations (1), (2) and (4).

$$C_i = \begin{vmatrix} 1/s_{ix} & 1/2s_{ixy} \\ 1/2s_{ixy} & 1/s_{iy} \end{vmatrix} \quad (9)$$

and $$C_r = \begin{vmatrix} 1/s_{rx} & 1/2s_{rxy} \\ 1/2s_{rxy} & 1/s_{ry} \end{vmatrix} \quad (10)$$

The rotation matrices for the incident and refracted ray pencils are:

$$R_i = \begin{vmatrix} 1 & 0 \\ 0 & \cos\theta_i \end{vmatrix} \quad (11)$$

and $$R_r = \begin{vmatrix} 1 & 0 \\ 0 & \cos\theta_r \end{vmatrix} \quad (12)$$

Inserting the matrices equations (7)-(12) into equation (6) we obtain, after some algebra, the following equations for the coefficients of the surface S:

$$s_{xy}=(n_r \cos\theta_r - n_i \cos\theta_i)s_{rxy}s_{ixy}/(s_{ixy}n_r \cos\theta_r - s_{rxy}n_i \cos\theta_i) \quad (13)$$

$$s_x=(n_r \cos\theta_r - n_i \cos\theta_i)s_{rx}s_{ix}/(s_{ix}n_r \cos\theta_r - s_{rx}n_i \cos\theta_i) \quad (14)$$

$$s_y=(n_r \cos\theta_r - n_i \cos\theta_i)s_{ry}s_{iy}/(s_{iy}n_r \cos\theta_r - s_{ry}n_i \cos\theta_i) \quad (15)$$

Inserting the above coefficients into equation (5) gives the equation of surface S. In many cases it will be convenient to make the assumption that the wavefront $W_i$ is a spherical wave. Hence the term in xy in equation (3) may be set to zero. In the case of a perfectly collimating surface the refracted wavefront would be planar. However, for practical purposes we must assume the refracted beam will not be perfectly collimated. Hence, the wavefront $W_r$ defined in equation (4) corresponds to the maximum acceptable wavefront error after refraction through the surface S.

In the case where the surface S provides perfect collimation the terms $s_{rx}$, $s_{ry}$ and $s_{rxy}$ tend to infinity. Assuming that the incident wavefronts are parabolic equations (13)-(15) become:

$$s_{xy}=(n_r \cos\theta_r - n_i \cos\theta_i)s_{ixy}/(-n_i \cos\theta_i) \quad (16)$$

$$s_x=(n_r \cos\theta_r - n_i \cos\theta_i)s_{ix}/(-n_i \cos\theta_i) \quad (17)$$

$$s_y=(n_r \cos\theta_r - n_i \cos\theta_i)s_{iy}/(-n_i \cos^2\theta_i) \quad (18)$$

For spherical incident wavefronts of radius s we set $s_{ixy}$=infinity and $s_{ix}=s_{iy}=s$ to obtain:

$$s_x=(n_i \cos\theta_i - n_r \cos\theta_r)s/(n_i \cos\theta_i) \quad (19)$$

$$s_y=(n_i \cos\theta_i - n_r \cos\theta_r)s/(n_i \cos^2\theta_i) \quad (20)$$

The above equations are essentially the standard meridional and tangential Coddington equations.

Note that in the above analysis the refracting surface could be replaced by a mirror of the same curvature. The only required modification to the above theory is to replace the index $n_r$ by $-n_r$. Note also that the divergences of the beams and the surface and wavefront curvatures illustrated in the drawings have been greatly exaggerated for the purposes of illustrating the theory. The limitations of Coddington theory apply, restricting the divergence angles to a few degrees.

Referring to FIG. 26 we will use equations (13) to (15) to estimate the surface curvature of the surface elements $\Delta S$ (given by the product $\delta x \, \delta y$) of the surface S.

The refractive index and beam angles are as follows:

$n_r$=1.492 (PMMA, optical acrylic);

$n_i$=1.585 (Polycarbonate);

$\theta_i$=75°; and $\theta_r$=85°.

We define the wavefront "s" parameters of equations (3) to (4) as follows:

$s_{ix}=\delta x/\delta\theta_{ix}$; $s_{iy}=\delta y \cos\theta_i/\delta\theta_{iy}$; $s_{rx}=\delta x/\delta\theta_{rx}$; and $s_{ry}=\delta y \cos\theta_r/\delta\theta_{ry}$.

The beam divergence angles are $\delta\theta_{ix}$=0.2°; $\delta\theta_{iy}$=1°; $\delta\theta_{rx}$=0.1°; and $\delta\theta_{ry}$=1.25°

Finally, the dimensions of the surface area element $\Delta S$ are:

$\delta x=\delta y=1$ mm.

Now applying equations (13) to (15) and assuming that the incident and refracted wavefronts and the surface are elliptic in shape (allowing us to set $s_{ixy}=s_{rxy}=s_{xy}=\infty$) we obtain for the coefficients of the equation of the surface element given by equation (5).

$s_x=-95.7$; $s_y=-64.8$; and $s_{xy}=\infty$ (units are millimeters)

The intermediate values obtained in the calculation are summarized in Table 1 below.

TABLE 1

| Surface element dimensions (mm.) | | | Beam divergence angles (degrees) | | | |
|---|---|---|---|---|---|---|
| dx (mm.) | dy (mm.) | | dtheta_ix | dtheta_iy | dtheta_rx | dtheta_ry |
| 1.0 | 1.0 | Deg: | 0.2 | 1 | 0.1 | 1.25 |
|  |  | Rad. | 0.00349 | 0.01746 | 0.00175 | 0.02182 |

| Principal ray angles degrees (and cosines) | |
|---|---|
| theta_i | theta_r |
| 75.0 | 85.0 |
| costheta_i | costheta_r |
| 0.3 | 0.1 |
| s_ix | s_iy |
| 286.4 | 14.8 |
| s_rx | s_ry |
| 572.9 | 4.0 |
| n_i | n_r |
| 1.585 | 1.492 |

| n_r * costheta_r − n_i * costheta_i |
|---|
| 0.280 |

| Surface "radii of curvature" | |
|---|---|
| s_x | s_y |
| −95.7 | −64.8 |

SUMMARY OF THE INVENTION

In contrast to prior art the present invention provides a means of delineating a runway, pathway or roadway with compact optic and reduction in air spaces above ground level. The present invention provides a well defined illuminating beam so improving safety and encouraging improved navigation. The novel optical arrangement provided also enables a compact geometry which is mechanically robust and has a smoothly tapered profile such that any impact by a vehicle running over the unit has minimal effect.

In addition the electronic control of the active components in the current invention may be remotely addressed so that adjustments may be made to the illumination pattern without direct ingress into the housing of the system.

In one embodiment of the invention a near TIR (total internal reflection) arrangement is provided which collects light from a collimation optic situated entirely below ground level. This light is then refracted laterally at an oblique angle. The refracted light is further refracted and conditioned by a toroidal output lens so that the arrangement has an exit aperture of small height and that provides well defined illumination on the ground plane. Illumination levels of several lux or more are achieved at the furthest point (typically around one meter of more) of the illuminated area.

In another embodiment reflective surfaces are provided to redirect otherwise wasted light onto the solar cell or similar photoelectronic device.

In another embodiment the intensity distribution of the illuminating beam is used to illuminate an area of paint or other markings at ground level. The paint can be simply reflective—perhaps enhanced by the addition of reflective particles. Additionally or alternatively, the paint can be luminous (phosphorescent) so that when it has been "charged" by incident light falling onto it from the illumination system or from the sun, it subsequently emits light (not necessarily at the same wavelengths as the incident light) over an extended time period, which may be minutes or hours. The illuminating beam intensity distribution is controlled in such a way that it provides a uniform illumination (when viewed by the pathway user) after reflection from said luminous paint. The painted area illuminated by the beam may take the form of a pattern of spots or strips which are controlled in their density (i.e. number of dots per unit area) such that a desired intensity pattern may be achieved.

This provides shaped illuminated areas having uniform illumination. In the case of luminous re-chargeable paint, the intensity distribution of the illumination is arranged to provide effective charging of the paint and uniform lux values over the whole length of the illuminated area. At night or in cloudy conditions where self-luminous re-chargeable paint would not be charged, a charge would be automatically be provided by the illumination system. In combination with the paint, the overall system would require much lower electronic power because it would only need to top up the "charge" in the paint that could not be provided from sunlight. The area of ground covered by the paint and the volume of paint required would also be minimised. In practical implementation of the pattern of strips or dot a thin mask template would be used to enable paint to adhere to only where it is required and to block paint from reaching the blank areas in between the strips.

Within the proposed system is a means for extracting external changes in electro-magnetic field such that energy is provided (such as that available from the motion of a moving vehicle). This energy can be used to remotely activate auxiliary light sources in the system. These light sources could be switched on to provide illumination in an orthogonal direction to the main pathway direction. This would be used for example as a warning light in the case a multiple vehicle collision. The extracted external electromagnetic energy may also be used to provide energy to charge capacitors or batteries within the system.

There is also provision in the system for the detection of the external or ground temperature. An active temperature sensor such as a thermistor is provided to detect this temperature. When the temperature falls below freezing point an electronic detector circuit activates an electronic controller such that the illumination beam (LED) flashes intermittently. This feature is employed as a warning of ice on the pathway.

The invention is described in terms of ground level illumination and words such as "up", "down", "top" and "bottom" are used with that normal orientation in mind. In any given embodiment of a device according to the invention, it is expected that it will be clear from the design of the device where the intended ground level lies and the orientation in which it is to be used (i.e. with the light emerging above ground!) It is immediately apparent that devices according to the invention could be used in other orientations, perhaps to provide emergency lighting along walls or ceilings or to illuminate notices or advertisements. Such uses are intended to fall within the scope of the invention, as are the devices when differently orientated during manufacture, transport or storage prior to installation.

DETAILED DESCRIPTION OF THE INVENTION

The invention will now be described in detail with the aid of the accompanying drawings.

Figure 1:
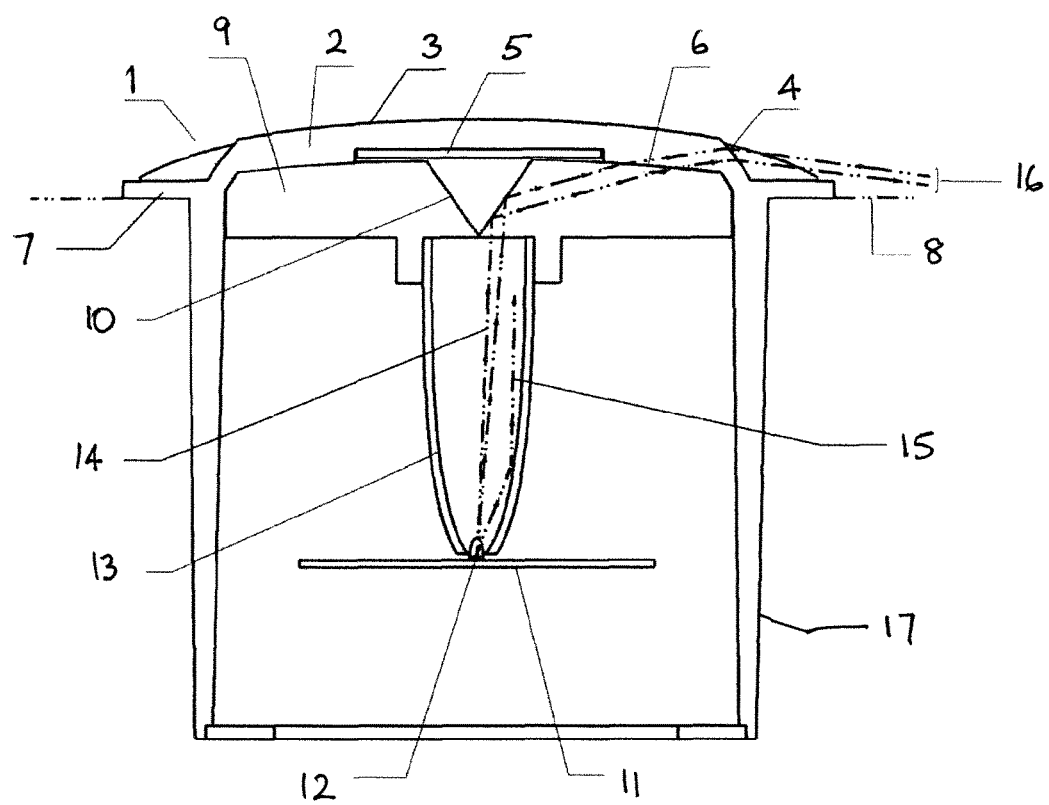
FIG. 1 shows a cross-sectional side view of a road stud according to a preferred embodiment of the invention.

FIG. 1 shows a cross-sectional side view of a ground level illumination system 1, such as could be used to illuminate a road or pathway. For clarity only the key aspects of the illumination in one direction are described in detail. However, the arrangement is symmetrical and provides bi-directional illumination to the left and right sides as viewed in the drawing. A top block 2 comprising a low refractive index material has a curved upper surface 3. The refractive index of the top optical block 2 is 1.5 or less. The top block 2 incorporates a toroidal refractive surface 4 and a pocket to accommodate a solar cell 5. The upper surface 3 provides optical gain and helps the collection of sunlight energy for the solar cell 5. The top block 2 has a lower curved surface 6 and has a flange 7 which sits at the ground level as indicated by construction line 8.

The solar cell 5 is used to supply electrical power to the electronics and light source. The lower surface 6 of top block 2 is in optical contact with a high refractive index optical block 9. The form of the top surface of optical block 9 matches the form of the lower surface 6 of the top block 2. The refractive index of the optical block 9 is 1.585 or greater. In practice, blocks 2 and 9 are in optical contact, that is they are bonded together with an optical adhesive.

The optical adhesive has a refractive index that is similar to the refractive index of optical block 2. The adhesive layer typically has a thickness of <100 microns. Optical block 9 incorporates a reflective surface 10. The two facets of the reflective surface 10 are preferentially biconic having a vertex convex radius of around 600 mm in one azimuth and infinite radius in the other azimuth. The angle of the "V" of surface 10 is around 72 degrees. This refers to the average tangent of the facet surfaces.

A printed circuit board (PCB) 11 houses an LED light source 12. A hollow, reflective collimator (preferentially a compound parabolic concentrator) 13 directs rays such as direct rays 14 and reflected rays 15 towards the reflective surface 10. The divergence of the rays after they exit the top of the collimator 13 is less than 6 degrees or so. The space immediately above the facets of the reflective surface 10 is air such that the reflection occurs as total internal reflection (TIR). Rays 14 and 15 incident on surface 10 and reflected by it are further refracted in a pre-determined direction on passing through the interface 6 (the demarcation line between regions of high and low refractive index). The interface 6 is preferentially curved with a radius of around 400 mm and a conic coefficient of −15. The rays are incident on the interface 6 at an angle close to that which would result in total internal reflection, which limits the divergence of the refracted beam. Some rays are refracted almost horizontally and some at greater angles. A maximum ascending angle of the useful rays is limited by the uppermost edge of the toroidal lens 4 to a shallow angle of less than about 15°. Preferably the central rays of the beam are at an angle of between 5° and 7° to the horizontal.

The rays 16 that emerge after refraction by the toroidal surface 4 are directed at oblique angles onto ground level, e.g. a pathway surface. The beam descends at a shallow angle determined by the height of the toroidal lens 4 above ground level 8 and the distance of the area of ground that the beam is intended to illuminate. The angle (measured for the central rays of the beam) is typically less than 5° and for illumination to a distance of only a meter the angle may need to be no more than 1°. To achieve the desired length and lux level of illumination on the pathway (so as to be readily seen by eye) the radii of surface 4 are around 40 mm in the vertical plane and 110 mm in the vertical plane.

Figure 2:
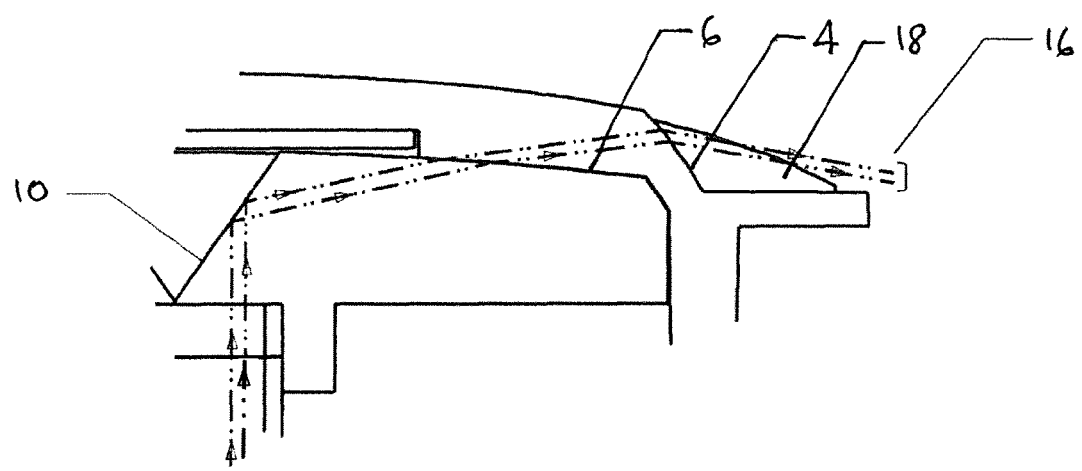
FIG. 2 shows an enlarged cross-sectional view of typical rays reflected and refracted by the optical components within the stud of FIG. 1.

FIG. 2 is an enlarged view of the ray paths and emergent rays 16.

Figure 3:
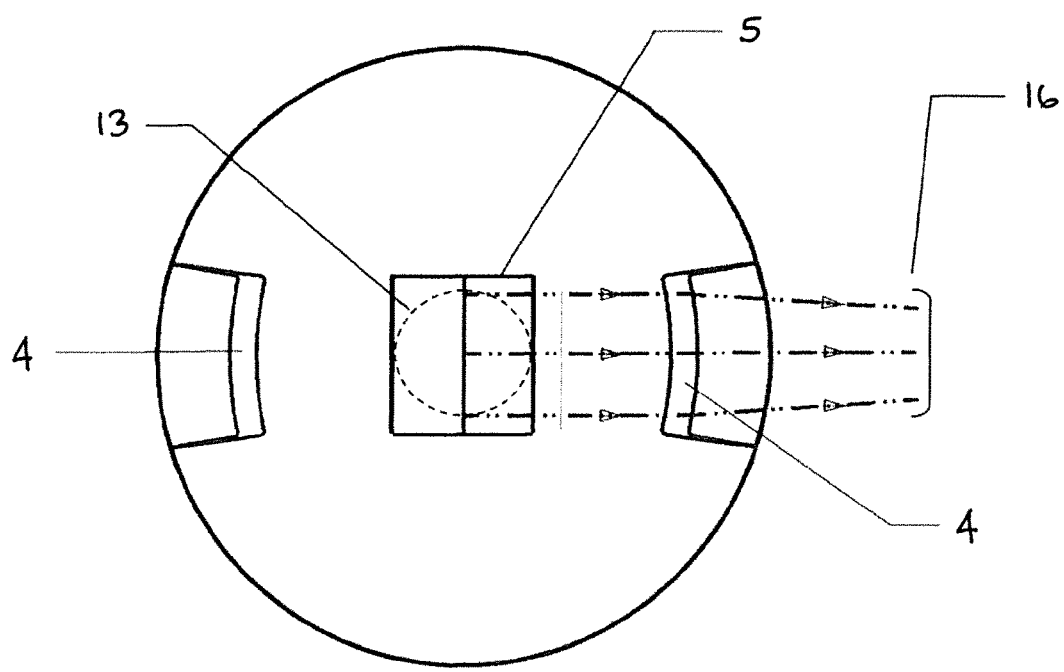
FIG. 3 shows a plan view and typical rays in the stud of FIG. 1.

FIG. 3 is a plan view of the ground level illuminator where only certain components are drawn for the purposes of clarity. The reflective collimator 13 is shown as a dotted circle. The exit diameter of the collimator 13 is typically 25 mm. It should be noted that in one direction the reflective surface 10 has a greater length than the diameter of collimator 13. Although the optic produces rays bi-directionally only rays 16 are shown travelling to the right after being refracted by lens 4 and emerging from the unit.

In contrast with the theoretical calculations and assumptions previously discussed, the actual rays within the bundle of rays incident on interface 6 diverge much more than a few degrees and extend along the surface much more than 1 mm. The rays incident on toroidal lens 4 are in turn somewhat divergent; in other words not precisely collimated. An optimisation algorithm is used within the optical design to create an illumination distribution that is well defined over length of 1 meter or so and with the width of illumination similar to the width of, for example, road lane markings. Such lane markings are typically produced with reflective thermoplastic material, paint or self-luminous (sunlight chargeable) paint of intermediate refractive index.

The solar cell 5 may be bonded securely in place in its pocket by use of clear adhesive or clear encapsulant. The depth of the side walls 17 of the optic 2 may be pre-determined depending on the type of pathway the illuminator is sunken into. The optic block 2 may equally well be constructed in two parts with a split at or just below the level of the flange 7 so that, for example, the optically transparent part can be made of one material chosen at least partly for its optical properties, while the remaining part can be made of a different material chosen for its mechanical properties. This ground level illuminator arrangement offers advantages over prior art arrangements in that a mechanically robust device is provided and at the same time light collected over a large solid angle below ground level is usefully directed to the desired receiving plane. Another benefit is that damage such as scratches to the uppermost surface of optic 2 do not significantly affect the illumination provided on the road or pathway. The exit surface of lens 4 itself is recessed and protected by tapered ramps 18 either side. The proposed arrangement is advantageous that most of the key components are at or below ground level and that the final refracting surface, toroidal lens 4, is small in height and typically similar in size to the dimension of the semi-diameter of the exit face of the collimator 13. Additional electronic devices and features are provided on the electronic PCB 11; these are not shown here but will be described in more detail in the subsequent description.

Figure 4:
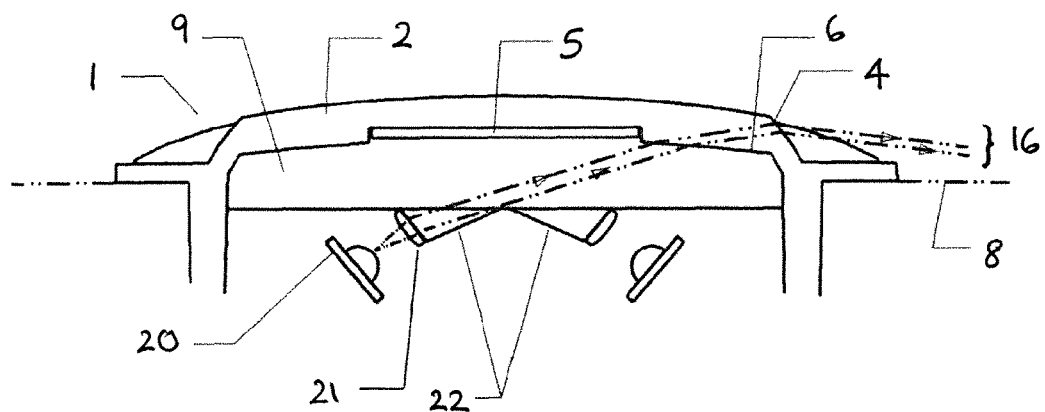
FIG. 4 shows a cross-sectional side view of a road stud according to a second embodiment of the invention.

FIG. 4 shows in cross-sectional side view of an alternative, compact ground level illumination system. In this embodiment an array of LED sources 20 are employed and lenses in a corresponding lens array 21 collimate and direct the light from each LED into the optic block 9. Again although the system is symmetrical and produces illumination bi-directionally, only the right hand rays are shown for the purposes of clarity. (It is not essential that the system should be symmetrical and produce illumination in two directions that are opposite one another.) The ray paths incident on the interface 6 are similar to the paths shown FIG. 1 and described in the previous embodiment. The arrays are arranged to lie in a shallow V shape 22 as shown. The LED axis and the axis of each corresponding lens are collinear. The left and right hand lens arrays 21 may be separate and therefore manufactured in two pieces or they may be formed in a single piece. The optical material of the lens arrays 21 may be an optical grade plastic. The lens array 21 is bonded to the lower surface of optics block 9 and is in optical contact. The lens array 21 is arranged so as to direct rays within blocks 2 and 9 along very similar paths to the rays shown in FIG. 1.

Figure 5:
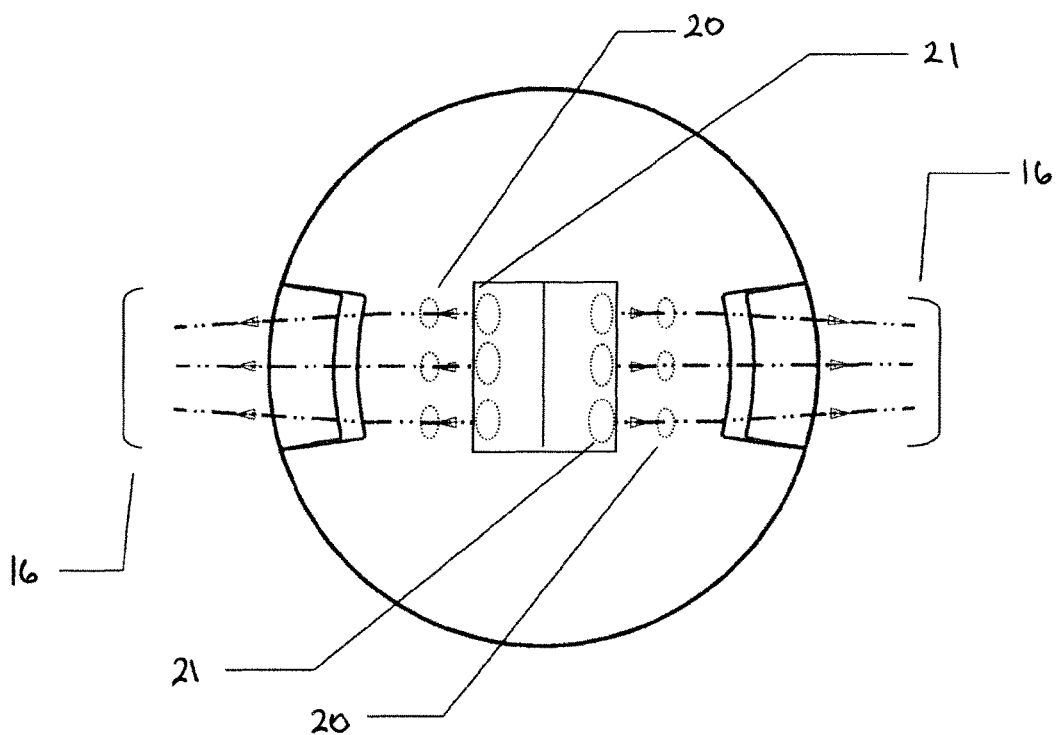
FIG. 5 shows a plan view and typical rays in the stud of FIG. 4.

Compared to the single LED 12 in FIG. 1, the LEDs 20 in FIG. 4 are preferentially different types and will have narrower angular output characteristics. Each LED in the array 20 has lower lumen power than the LED 12 in FIG. 1 but the LEDs are selected so that the total lumen power of all the LEDs 20 will be similar to that of the single LED 12 shown in FIG. 1. Although a three-fold LED and lens array is shown other numbers of LEDs 20 (depending on their output characteristics) and corresponding lenses 21 may be employed, including the possibility of just a single LED in each "array". This arrangement is beneficial because although the aperture of the lens surface 4 restricts the ray bundle in the vertical plane there is no fundamental restriction to the lens size in the horizontal direction. In other words the lens surface 4 is much wider horizontally than its vertical height. This corresponds at the input side of an extended LED and lens array 20 and 21. The arrangement is shown in plan view in FIG. 5.

It should be noted that for the two previous embodiments, the divergence of rays in a vertical plane incident on lens 4 must be within certain limits. Ray divergence in this vertical plane must be a few degrees or so. Firstly this enables rays to be refracted appropriately at shallow angles at the interface 6 and such limited divergence also enables rays to pass through the vertical aperture of lens 4 without significant light loss. In the horizontal plane, greater divergence is allowable and the horizontal radius of lens surface 4 may be adjusted to compensate for any additional divergence by focusing the emergent rays in the horizontal plane such that they are directed on to the pathway in a well delineated manner. The arrangement shown in FIG. 4 has the benefit that blocks 2 and 6 and the solar cell 5 are combined with the aid of adhesive to form, in effect, a single robust solid block of material. The arrangement of the illuminator embodiment in FIGS. 4 and 5 also has the advantage of being less deep, thus reducing the need for creating a deep hole in the road or pathway.

Figure 6:
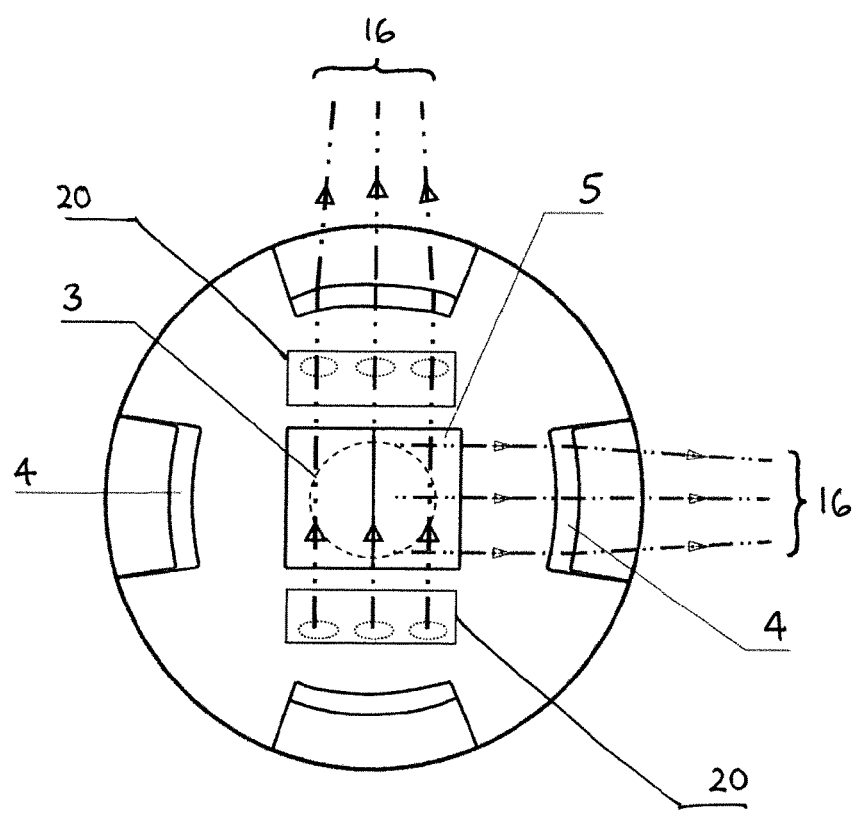
FIG. 6 shows a plan view and typical rays in a variant of the road stud of FIG. 3, which provides illumination in four directions.

In both of the previous embodiments the illuminating rays are described as being bi-directional, that is rays travel either left or right when in the view of the figures. It should be noted that other directions can also be illuminated by employing additional LED light sources or by combining the embodiment of FIG. 1 and the embodiment of FIG. 4. So for example, illumination may be provided along four directions. This embodiment is shown in plan view in FIG. 6. Here only rays for two of these four directions are shown for the purposes of clarity. The LED arrays are also not all drawn for similar reasons. Note that henceforth the top and bottom illumination direction is termed the orthogonal direction. In FIG. 6 the lens arrays 18 top and bottom in the drawing are totally separate such that they don't occupy the same space as reflective optic 10. In relation to this separation, some minor adjustments are be made to the general angle of incidence on surface 6 and the local form of surface 6 top and bottom for the ray paths that travel up or down in FIG. 6. The LEDs 20 for the orthogonal illumination directions are not necessarily on all the time but are switched on when a sensor is triggered above a pre-determined level by environmental effects such as temperature or moisture or a strong vibration. Such a strong vibration could be triggered by for example a multiple vehicle collision. As will be described in detail a later embodiment, the LEDs for the orthogonal direction of illumination can also be beneficially switched on remotely by signals received as external changes in electro-magnetic field which induce a charge within an induction coil contained within the illuminator housing.

Figure 7:
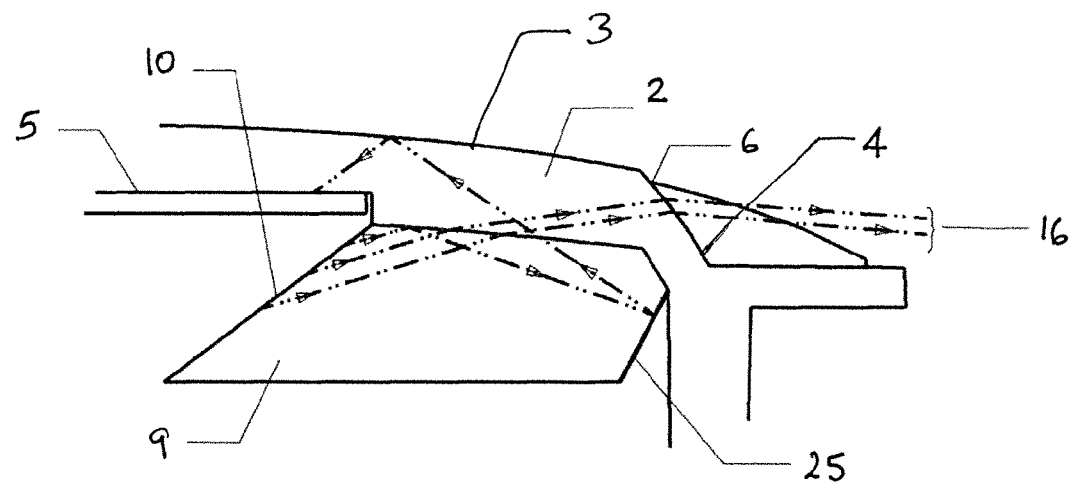
FIG. 7 shows an enlarged cross-sectional view of typical rays reflected and refracted by the optical components within a road stud according to a third embodiment of the invention.

FIG. 7 shows in cross sectional view another embodiment where a portion of the rim 25 of the lower block 9 is angled and coated with a reflective coating such that any rays that are totally internally reflected at surface 6 are reflected onto the solar cell 5. As seen in FIG. 7, after reflection from the rim 25, the rays may undergo further total internal reflection from the upper surface of the top block 2 to reach the solar cell 5. The reflective portion on the rim 25 is directly below lens 4 and has approximately the same width as that lens. This arrangement has the benefit of back reflecting otherwise lost light due to spurious rays originating from the LED source and increasing the energy collected by solar cell 5. The reflective coating on the surface 25 may alternatively be a partial coating, or be omitted altogether, which would allow a light sensor (not shown) to be placed after it so that the light level from the LED can be continuously monitored. The signal from such a light sensor may be used to adjust the current supplied to the LED and thus allow the light output from the LED to be maintained at a constant level.

Figure 8:
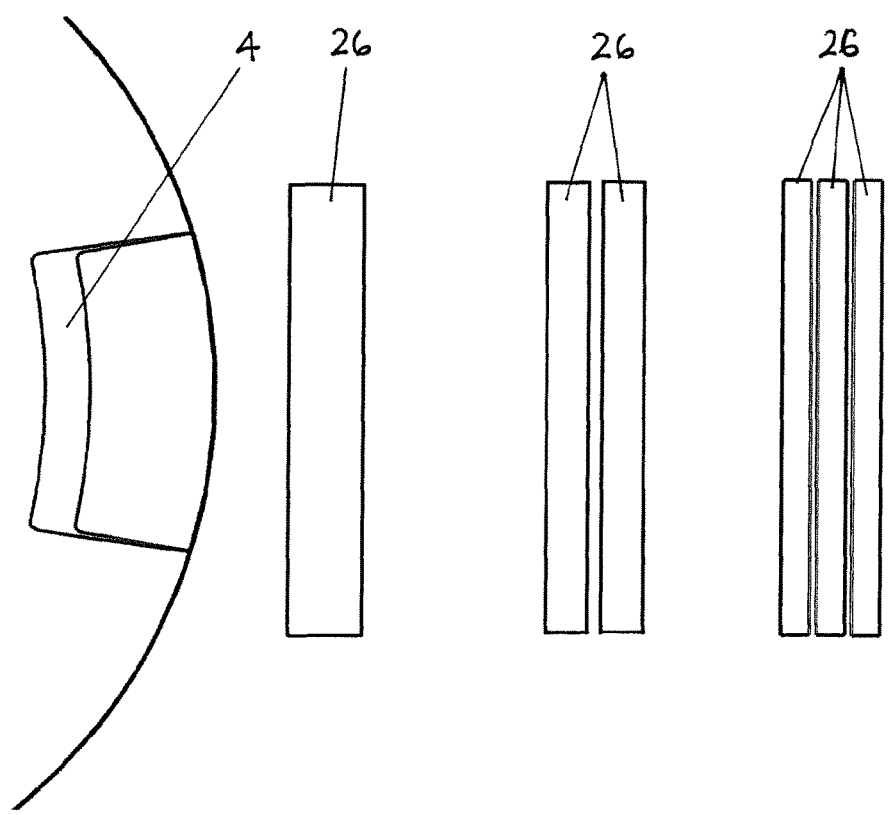
FIG. 8 shows a plan view of the exit lens of a road stud with a graduated pattern of luminous paint strips at ground level.

FIG. 8 shows in plan view the exit lens surface 4 of the ground illuminator and a pattern of paint or luminous material on the pathway arranged along the direction of the light rays emerging form the lens surface 4. The advantage of using the ground illuminator to illuminate such patterns or indeed a solid block of reflective or luminous paint is that the level of scattered, emitted and reflected light increases thus making the illuminated pattern much more visible to an observer. Also the ground level illuminator has an advantage over high level street-lights because it is much closer to the road and can thus illuminate more effectively. In this application of the ground level illuminator the electronic power supplied to the LED(s) may be beneficially reduced and/or a smaller solar cell, batteries or lower value capacitor may be employed.

As seen in FIG. 8, the desired pattern on the ground may conveniently be built up from repeating units such as dots or stripes 26. The density of such dots or stripes (i.e. the proportion of the ground area that they cover) can be varied with distance from the illuminator to give a uniform appearance after allowing for the attenuation or dispersion of the beam. In FIG. 8 the stripes 26 are shown with different widths. However, if the stripes (or other repeating units) are all of the same shape or width, their density may conveniently be varied by changing the spacing of the units with distance from the illuminator.

Figure 9:
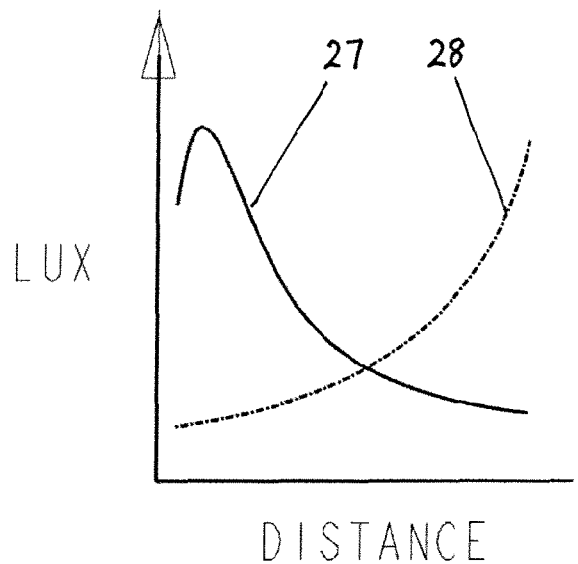
FIG. 9 shows the typical illumination level and density of strips against distance from the exit lens.

FIG. 9 shows as a solid line 27 a typical plot of illumination (in lux) versus distance from the ground illuminator. The level of illumination decreases with distance as the beam spreads out (if not perfectly collimated) and as light is scattered by particles in the air. The dotted line 28 in the plot indicates the frequency of dots or stripes of uniform size that when illuminated according to the previous embodiments provide a uniform illumination (uniform lux as viewed by an observer) across the whole length of the pattern of illuminated stripes. The frequency of the dots may be arranged so as to additionally compensate for the obliquity of the light rays striking the surface of the luminous material.

Figure 9A:
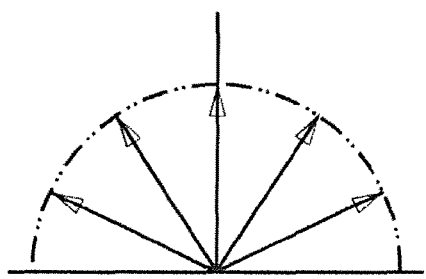
FIG. 9a shows the typical angular intensity distribution plot from an illuminated surface having a Lambertian scattering function.
Figure 9B:
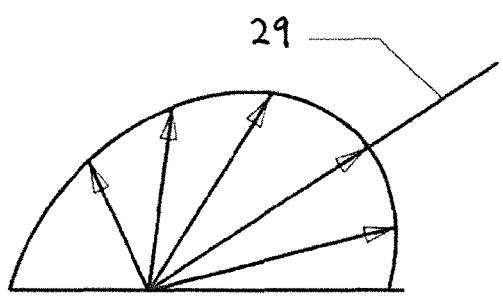
FIG. 9b shows the typical angular intensity distribution plot from an illuminated surface having an asymmetric scattering function.

FIG. 9a shows a scattering/reflection pattern from a lambertian surface, i.e. uniform scattering in all directions. FIG. 9b shows a directional scattering/reflection pattern from a directional diffuser. It may be desirable that the pattern on the ground should be perceived as uniform preferentially from a certain direction 29, e.g. from the direction of approaching travellers such as vehicle drivers. Because the proposed ground level illuminator produces an oblique beam directed towards the oncoming traveller the visibility of the paint illuminated by such a beam beneficially increases in that direction. It is also beneficial in reducing the charge requirements of the paint or indeed the density of the active luminous ingredients in the paint mix.

In the second illuminated strip of a bi-directional illuminator, that is where the light is travelling in the same direction as the traveller, glass spheres may be incorporated within the paint and these will reflect back the light substantially towards the traveller. Alternatively, the road markings could be pre-formed or moulded in situ to create a surface texture with any desired pattern of reflecting or scattering surfaces, perhaps designed according to Fresnel principles.

Figure 10:
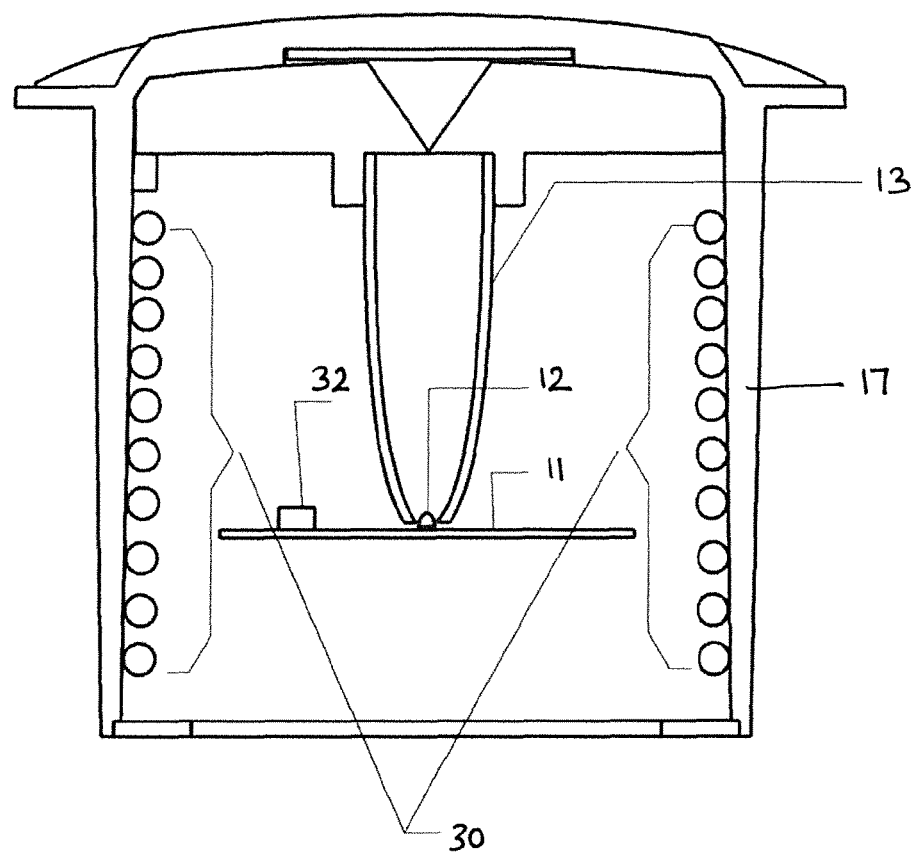
FIG. 10 shows a cross-sectional view of a road stud according to another embodiment of the invention that incorporates an induction coil and ferrite core.

FIG. 10 shows a cross-sectional view of another embodiment of ground level illuminator intended for use as a road stud. An inductive coil 30 is wound inside the wall 17 of the block 2. An additional component such as a ferrite cylinder may be used inside the cylinder formed by the coil 30. The coil has typically 100 turns of insulated wire. The PCB 11 houses the light sources, a temperature sensor 32 and other electronic components to harvest energy from currents induced in the coil 30 by the changing electromagnetic fields of passing motor vehicles and to store that energy, e.g. in capacitors or batteries, for later use by the system. The current that flows in the coil depends on a change in the magnetic field inside the coil as the vehicle passes. The change may arise from the magnetic field of the vehicle itself (which has been measured as approximately 10 µT at a distance of 1 m) or it may arise from the disturbance of the background magnetic field as the vehicle passes through it. The latter effect could be enhanced by providing a suitably positioned permanent magnet to artificially strengthen the background field. Alternative systems could be used for harvesting energy from passing vehicles, for example piezoelectric generators, or for harvesting energy from the environment, for example by exploiting differences between the ground and air temperature.

Figure 11:
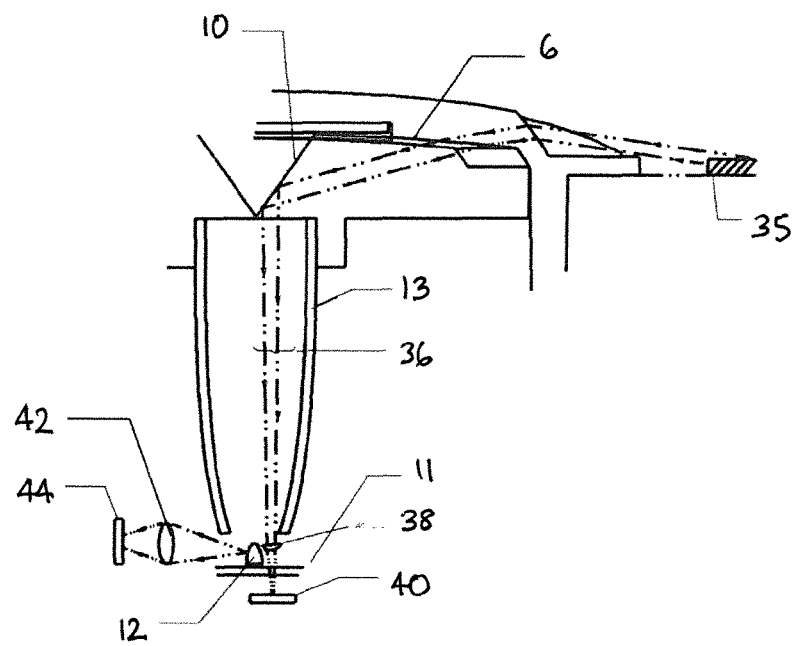
FIG. 11 shows a cross-sectional view of a road stud according to another embodiment of the invention that is suitable for monitoring light levels on a pathway or on luminous paint on a pathway.
Figure 12:
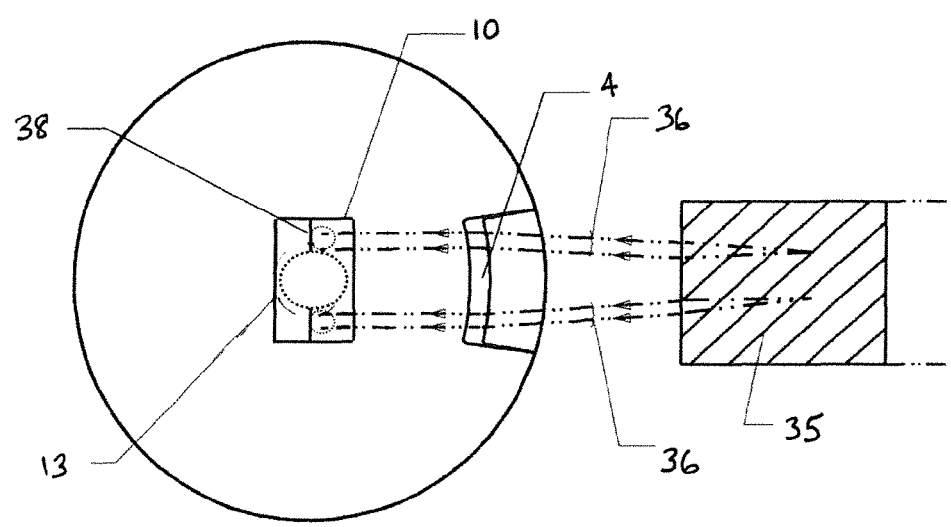
FIG. 12 is a plan view of the road stud of FIG. 11.

FIGS. 11 and 12 show a cross-sectional side view and plan view of yet another embodiment, which is suitable for monitoring the light level reflected back from a pathway or from luminous paint on a pathway 35. The light level from a pulsed LED source 12 is used to illuminate a nearby pathway or luminous paint on a nearby pathway 35 in conjunction with the previously described optic system shown in FIG. 1. Rays 36 of this pulsed light, back reflected from the pathway or luminous paint 35 are directed back through the optic system and are focused by means of a lens 38 onto a sensor 40. In the plan view of FIG. 12 the rays 36 pass through portions of the optic peripheral to the transmitted rays shown in FIG. 1 etc.; in other words the rays 36 lie outside the collimator 13 (shown as a dotted circle). The lens 38 gathers all bundles of such peripheral rays and directs them onto the sensor 40. The light level emitted directly by the LED 12 is measured by focusing a small portion of the light from the LED 12 onto a sensor 44 via a focusing lens 42. The lens 42 and sensor 44 for measuring the direct light from the LED 12 can equally be in other positions, such as the space behind the partial mirror at the rim 25 of the optics block 9 as described in the embodiment of FIG. 7, though long leads are then needed to connect the sensor to the PCB 11.

Figure 13:
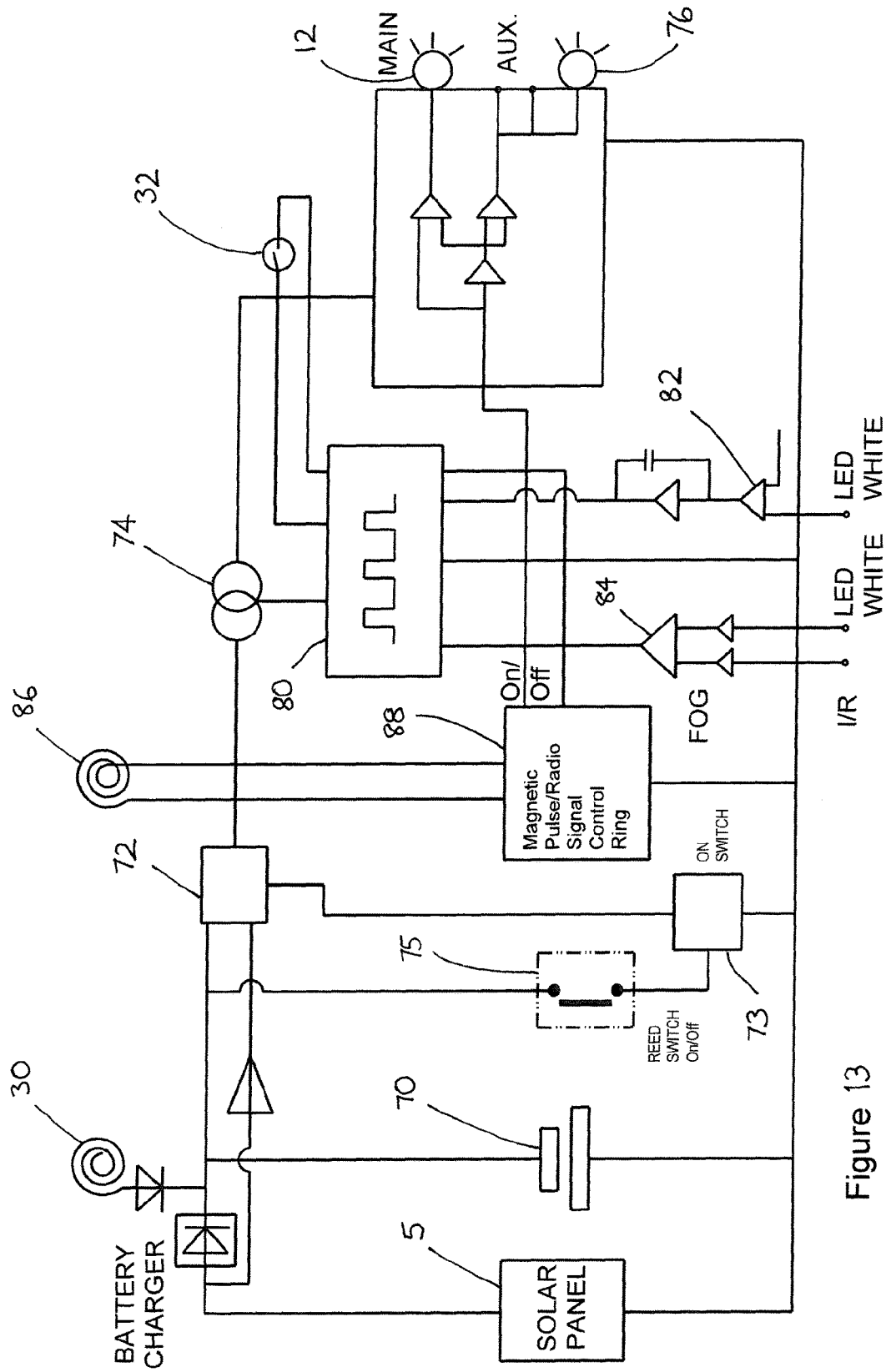
FIG. 13 shows a schematic of the LED light level sensing and control electronics.

FIG. 13 illustrates schematically a control circuit for the illumination system. The solar cell 5 and the magnetic coil 30 supply power to a rechargeable battery 70, which in turn supplies the rest of the control circuit and the LEDs 12. Alternatively, the solar cell 5 and the magnetic coil 30 can supply the circuit directly. The voltage level of the battery 70 is monitored by a switching circuit 72, which controls the charging and discharging of the battery 70 and the onward supply of power to the circuit. In particular, the circuit 72 will switch off the supply from the battery 70 if the voltage falls too low.

An on/off master switch 73 may be provided, which is under the control of a reed switch 75. Following manufacture, the circuit may be switched off in order to prevent the beams operating in the dark conditions under which the road stud will normally be store prior to use. When the road stud is ready to be installed in a road, a magnet can then be applied to the outside of the housing to operate the reed switch 75 and turn on the master switch 73. Other means of remotely operating the master switch 73 could be used, including means that permit the operation of the circuit to be turned on and off after installation of the road stud.

The power supply to the circuit ideally functions as constant current source 74, which supplies power to the main LED 12 and to one or more optional auxiliary LEDs 76. The auxiliary LEDs 76 may provide backup in the event that failure of the main LED 12 is detected and/or they may emit light of a different wavelength, for example infra-red for the purpose of fog detection as explained below. A logic circuit 78 for controlling the operation of the LEDs 12,76 is illustrated purely schematically. The preferred method of controlling the (average) brightness of the LEDs 12,76 is not to operate them continuously but to switch them on and off with a variable mark-space ratio.

The output of the current source is therefore controlled by a variable mark-space multivibrator 80 to switch the current on and off at high frequency in the desired mark-space ratio for powering the LEDs.

The multivibrator 80 may be responsive to various inputs that affect the switching of the LEDs 12,76. For example, a first comparator 82 compares the back-reflected light from the road markings with the known output of the main LED 12. The output of the first comparator 82 is passed through an integrator to generate a signal that may indicate when the brightness of the LED 12 needs to be increased in order to re-charge the luminous paint of the road markings, as explained in relation to FIG. 14 below. The integrator averages the signal over a time period of, say, 15 minutes in order that the system should not react to short term changes in illumination such as vehicle headlights. A similar comparator (not illustrated) may compare the light intensity received directly from the main LED 12 against a reference signal as part of a feedback loop to compensate for any inherent dimming of the LED output.

A further comparator 84 compares the back-reflected white light from the main LED 12 with the back-reflected infra-red light from an auxiliary infra-red LED 76 to identify the presence of fog in the vicinity, as explained in more detail below. If fog is detected, the brightness of the main LED 12 may be increased and/or it may be caused to flash in a warning pattern to motorists. A thermal switch 32 such as a thermistor may detect freezing conditions and provide a signal to the multivibrator so that again the main LED 12 can be flashed in a distinctive pattern to warn road users of the likely presence of ice. Finally, a second magnetic coil 86 is illustrated, which has its own control circuit 88. A passing vehicle will induce an electromagnetic pulse in the coil 86 that can be detected by the control circuit 88, which in turn transmits a signal to the multivibrator 80 to indicate the presence of the vehicle. By this means, on little-used roads power can be saved by switching on the LED 12 only when a vehicle is passing. These inputs to the multivibrator 80 are essentially independent of one another so it will be clear that any subset of them may be used in combination within the scope of the invention.

In FIG. 13 a second magnetic coil 86 for detecting the magnetic field of a passing motor vehicle is illustrated separately from the first magnetic coil 30 that derives power from the magnetic field of a passing motor vehicle. It will be apparent that with suitable electronics a common coil could be used for both tasks. Alternatively, if it is found that power cannot be generated efficiently from passing vehicles, the first coil 30 could be omitted but the second coil 86 retained. Experiments have shown that a car passing a detector at approximately 50 km/h at a distance of 1 meter causes a variation in the local magnetic field strength of approximately 3000 nT over a timescale of about 3 seconds, which should be readily detectable. The second magnetic coil 86 could also be arranged to receive a pulsed signal (e.g. a radio frequency signal) from a specially adapted vehicle in order to program or change the mode of operation of the device. For example, the traffic authorities could switch on all the devices along a stretch of road to warn of a vehicle accident or other hazard ahead.

As already mentioned, the comparator 84 compares white light that has been emitted from the main LED 12 and reflected from the road markings with infra-red light that has been emitted from an auxiliary LED 76 and reflected from the road markings. It has been found that on passing through fog, shorter wavelengths of light are more strongly attenuated so visible light is more strongly attenuated than near infra-red light. By monitoring the ratio of back-reflected infra-red light to white light (or to some specific wavelength of visible light), a change in the ratio will indicate the presence of fog, which can be used as a trigger to increase the brightness of the main LED 12 and/or to flash the main LED 12 in a warning pattern to road users. Instead of using a dedicated infra-red LED 76, it would be possible to carry out the same comparison by using filters to detect the ratio of light intensity at two different wavelengths emitted by the white LED, for example blue light at 450 nm and red light at 660 nm, while noting that the closer the two wavelengths are, the smaller will be the difference in attenuation between them. Instead of relying on back-reflection from the road markings (which might introduce a complicating factor if luminescent paint is used) a dedicated reflector could be set into the road surface or placed at the roadside for use in fog detection. Alternatively, in the usual situation where the illumination devices are arranged in a line along a road, the wavelengths of light emitted by one device could be measured by the next device in sequence to indicate the presence of fog between them.

Figure 14:
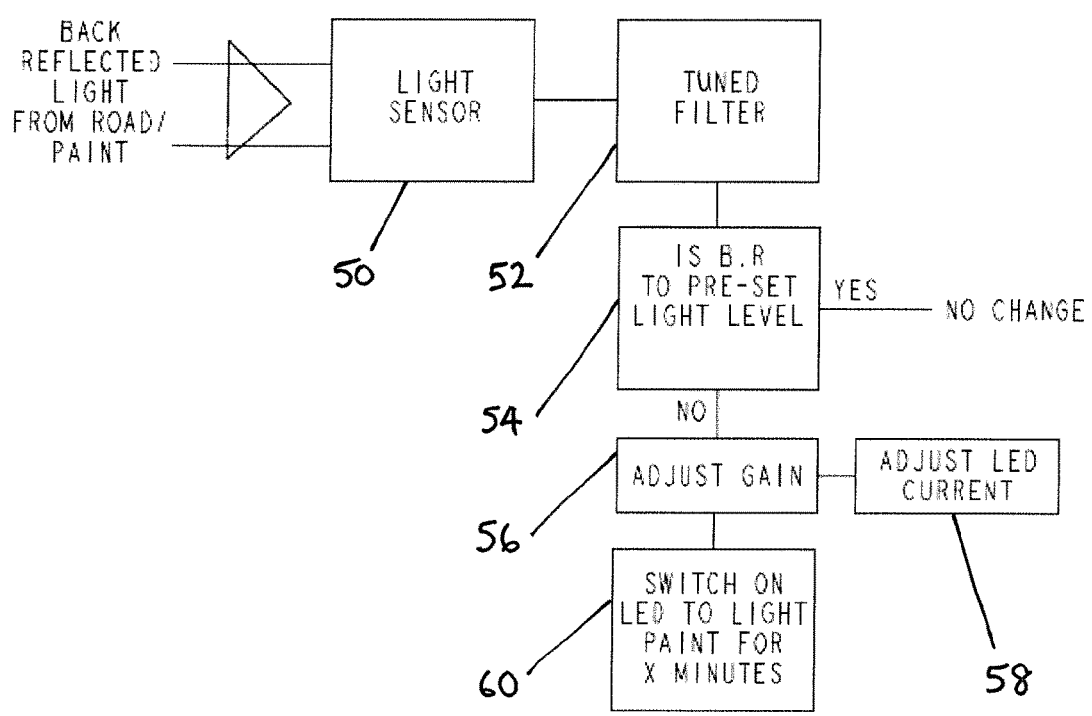
FIG. 14 shows a schematic of the process for controlling the system in response to reflected light levels.

The control electronics shown in FIG. 13 maintain the illumination of the markings at a constant light level using a process as shown schematically in FIG. 14. The back reflected light level detected by the sensor 50 is compared with a pre-determined level at step 54. If it falls below the pre-determined level the electronics system adjusts the gain (step 56) by either adjusting the light level of the LED 12 to maintain a constant back reflected light level (step 58); or temporarily increasing (for a set period) the current flowing in LED 12 (step 60) such as to temporarily increase the light incident on the paint and therefore charge the said area of self-luminous paint 35 nearby on the ground. Instead of varying the current to change the light level emitted by the LED, it could be operated at a single current level but pulsed with a varying mark-to-space ratio to change the average intensity of the light emitted, as described above in connection with FIG. 13. If the emitted light is directly visible to observers then normally the pulse frequency should be made high enough not to be noticeable. (This does not contradict the option of simultaneously flashing the LED at a lower frequency as a warning of fog or ice.)

Because the LED 12 is pulsed, the control circuitry shown in FIG. 13 can include a filter 52 on the output of the light sensor 50, which is tuned to a pass band around the pulse frequency so that only back reflected light originating from the LED 12 is measured. This arrangement ensures that the LED light is not changed in response to changes in ambient light level or, in the case of roadways, vehicle lights. Additionally, or alternatively, the ambient light level could be accounted for by measuring it between the LED pulses or by using a second, low-pass filter on the output of the sensor 50 or by measuring the output of the solar cell 5. Only back reflected light is measured by sensor 50. This sensor is housed in a compartment that is totally shielded from the direct light of LED 12. Various pre-set electronic control levels are incorporated as safeguards within the electronic system so that the LED 12 light is not changed wildly or frequently. The mark to space ratio of the LED 12 pulses would be at least 50:50 and preferentially 80:20 that is 80% on and 20% off.

It should be noted that this arrangement can be used for monitoring back reflected light paint markings in one direction using the arrangement that employs one LED as in FIG. 11 (essentially this is a similar arrangement to that of FIG. 1). In this case this direction would be the most important direction in that it monitors markings as seen by approaching travellers such as drivers in vehicles. When monitoring in two directions is required a corresponding monitoring arrangement may be employed but in conjunction with the embodiment shown in FIG. 4. Here back reflected rays from the road markings or paint travel in reverse manner to the rays 16 shown in FIG. 4 but only rays offset to each side of the LED arrays 20 are detected by sensors. In other words in the plan view FIG. 5 the sensors are positioned beyond the end of each array, i.e. above the top LED and below the LED (repeated for each side, left and right). In this arrangement back reflected light from road markings or paint on the left or right sides may be independently monitored and used to control the corresponding LED array light level.

The control circuit may incorporate receiving means (not shown) to allow it to be remotely addressable from a central controller, for example to activate the system as a warning in case of accidents, traffic congestion or fog. It may also incorporate transmitting means (not shown) to allow it to send signals back to the central controller, for example to report local temperature, light levels, traffic movements or fault conditions. The control circuit may incorporate features that are automatically activated depending on environmental conditions. For example the temperature sensor 32, which may be a thermistor, can detect the external or ground temperature. When the temperature falls below freezing point the main illumination beam or a secondary LED can be made to flash intermittently as a warning of ice on the pathway.

The colour and brightness of the LED(s) may be chosen to suit the desired application. If the LED is to illuminate the ground surface by reflection then the colour should be white, or whichever colour it is desired that observers should see. If the primary purpose of the system is to "charge" luminous markings then the LED should be chosen to emit strongly at the wavelengths of light that are most strongly absorbed by the luminescent material, which need not be visible to the human eye.

Essentially the same optical arrangement as described in connection with FIGS. 1 to 3 could be used with a laser source in place of the LED 12. The laser beam could be widened to act just like the collimated beam from the LED. Alternatively the laser beam could be fed through a beam steering arrangement mounted in the body of the system to trace out a desired pattern on the road surface (after making due allowance for distortion of the pattern as a result of the optics). This arrangement would allow the delicate beam steering mechanism to be protected by the robust assembly of the top block 2 and optics block 9, while directing the beam at a highly oblique angle to the road surface. A laser beam is naturally well collimated and it should be possible to project it through long distances, perhaps in excess of 10 meters for a smooth, level and straight road surface. A row of such systems could provide an essentially continuous beam or illuminate a continuous line.

Optionally, a sensor is provided which detects the proximity of a person or vehicle and switches on the illumination when they are within a predefined range. The sensor may be a light sensor adapted to detect light from an oncoming vehicle headlamp; a movement or vibration sensor adapted to detect motion of the person or vehicle; or a noise sensor which detects the sound of the vehicle engine. Alternatively an ambient light level sensor, such as the solar cell 5, may switch on the illumination at a pre-set light level so that light is emitted continuously during darkness.

Figure 15:
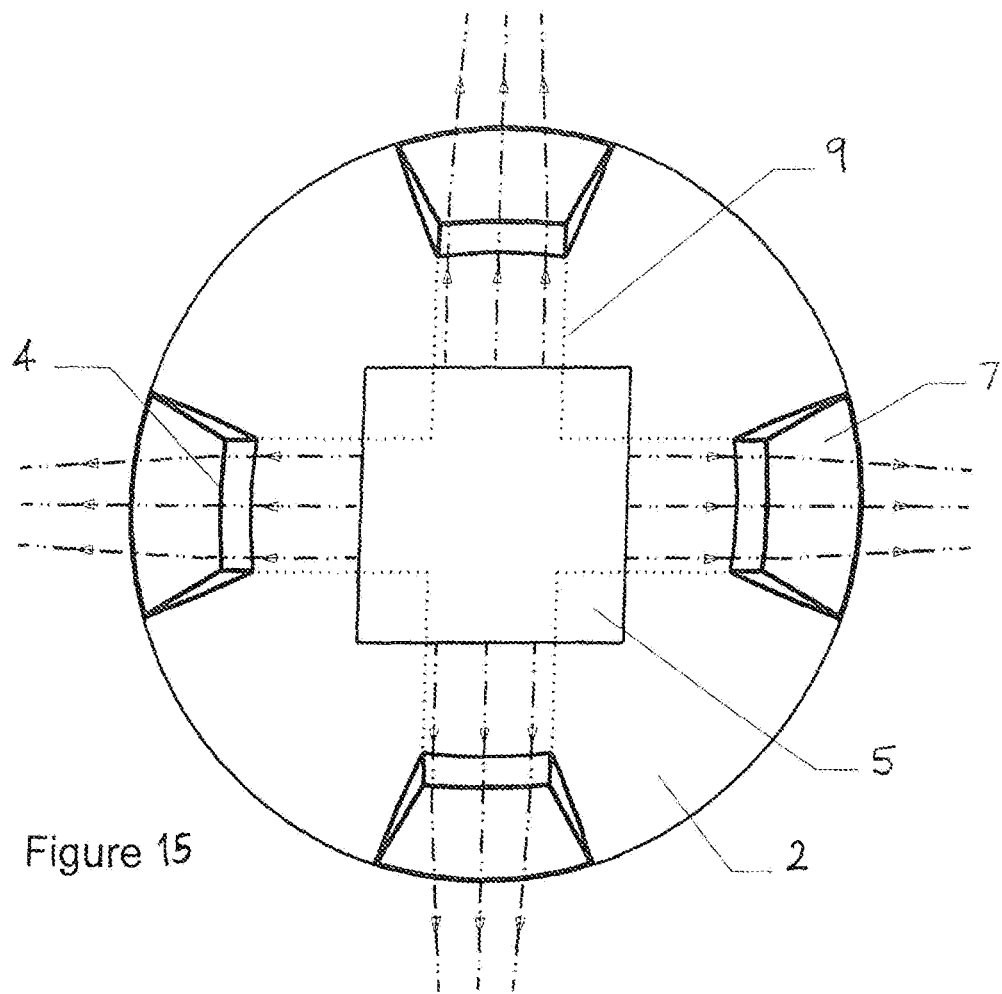
FIG. 15 shows a top plan view of a further embodiment of the invention, which uses Fresnel prism arrays.
Figure 16:
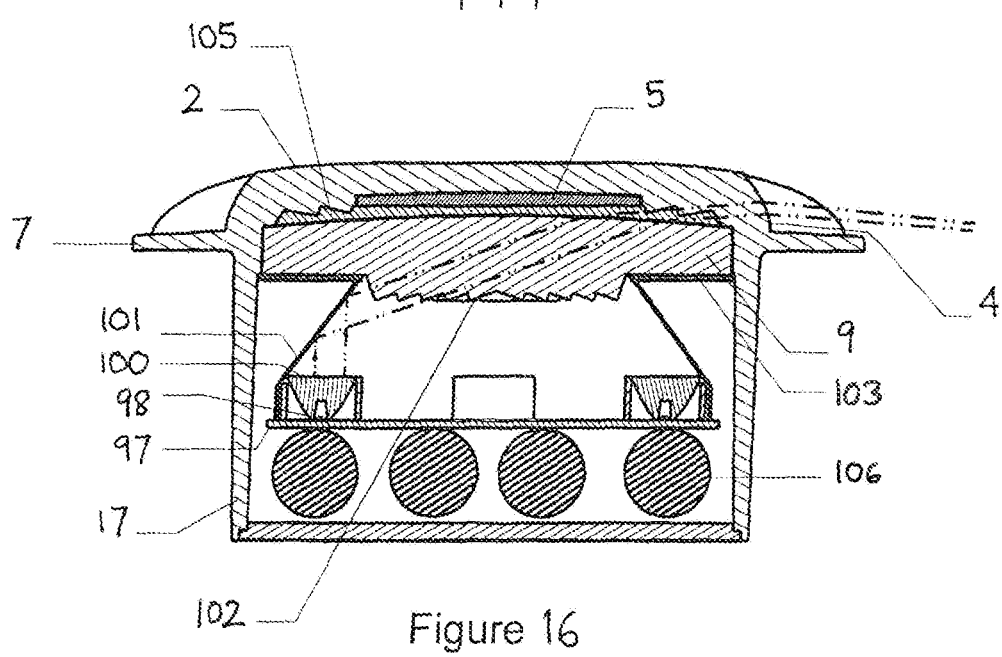
FIG. 16 is a vertical cross section through the road stud of FIG. 15.

A preferred embodiment for a quad illuminator is shown in FIG. 15 in plan view and in FIG. 16 in cross-sectional side view along section A-A'. A view from the bottom of the embodiment is shown in FIG. 17.

In FIG. 15, four lenses 4 are shown. The outline of the lower optic block 9 is shown (dotted) as a cross shape.

Figure 17A:
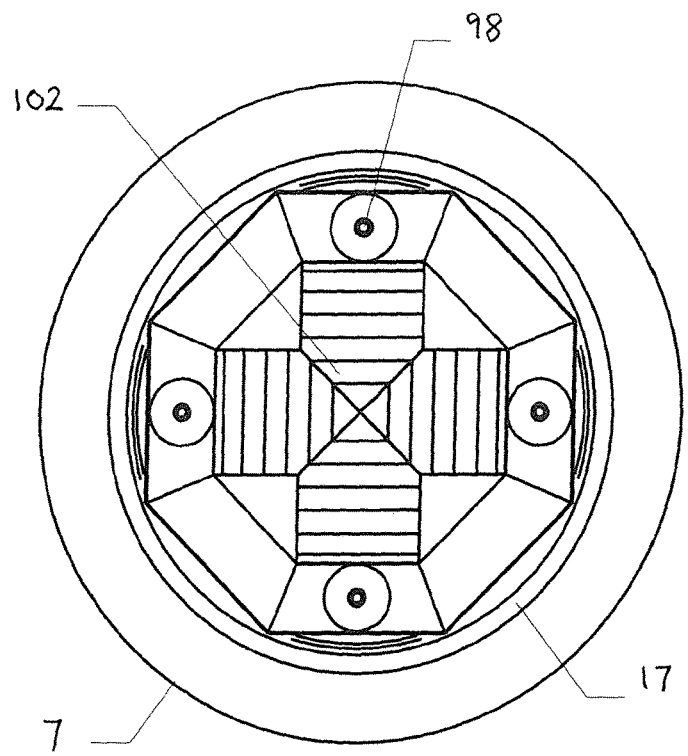
FIG. 17A is a cross sectional view from below of the road stud of FIG. 15.
Figure 17B:
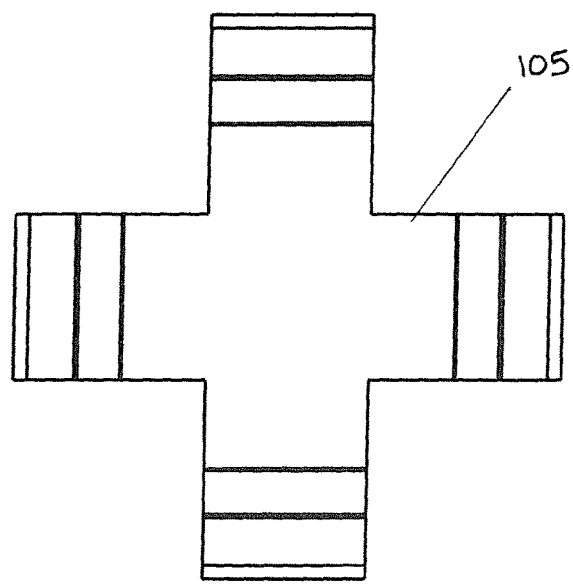
FIG. 17B is a plan view of a Fresnel array insert of the road stud of FIG. 15.

In FIGS. 16 and 17A a printed circuit board (PCB) 97 houses four LEDs 98. Four collimators 100 direct the collimated light with a divergence of less than 15 degrees onto a facet of a reflective array 101. The reflective array 101 is attached to the bottom block 9 via a plate 103 that lies flat against part of the lower surface of the bottom block 9. Alternatively, the reflective array 101 may be attached to the bottom block 9 by bonding at the contact edge or by bayonet pegs (not shown) integral to the upper edge of the array. The pegs locate into appropriate holes in the bottom block 9. After reflection from the facet, light is directed into a Fresnel prism array 102 such that light is transmitted in a desired direction through bottom block 9 and then refracted into top block 2. Finally light emerges out of the system through a lens 4. The direction of the rays reflected by a facet of the reflective array 101 are in the same direction as the ray direction created by reflection of the collimated beam from the reflective surface 10 in the embodiment of FIG. 1.

In this embodiment, the top block 2 is generally similar to that in FIG. 1, except that it comprises an insert 105, seen in cross section in FIG. 16. The insert 105 is shown in plan view in FIG. 17B. A lower surface of the insert 105 defines the lower surface of the top block 2, and therefore also provides the interface with bottom block 9 to refract the light into a rising beam in accordance with the present invention. An upper surface of the insert 105 is formed as a second Fresnel prism array that is bonded to a complementarily shaped surface of the main top block 2. The benefits of this compound structure of the top block 2 are that the material of the insert (e.g PMMA) can be chosen principally for its optical properties to define the refraction at the interface while the material of the main top block (e.g. polycarbonate) can be chosen principally for its mechanical properties—though it does also determine the refraction at the lenses 4. It should be noted that the two Fresnel prism arrays in this embodiment are used in an unconventional way, whereby they do not substantially change the direction of the light beams passing through them, the facets of each array being aligned so that the beams are approximately normal to them. The purpose of the Fresnel arrays is to allow the light beams to pass between two media of different refractive index without significant refraction and without stray reflections, in a more compact arrangement than would otherwise be possible (e.g. a prism block with a single surface aligned in the same orientation as the facets of the Fresnel array). This allows the relative thickness of the top block 2 to be increased within the overall envelope of the road stud, which provides good impact resistance for protection of the solar array 5 and other delicate components.

The reflective array 101, bottom block 9 and PCB 97 form an enclosed air tight space when assembled. The volume outside this assembly, within the housing 17, may be permanently filled with a potting compound so as to provide immunity from moisture ingress. By encasing the components and batteries 106 in this way, component deterioration from environmental effects and moisture is minimised.

As shown in FIG. 16, an advantage of this embodiment is that LEDs 98 are all on one plane PCB 97. However, because of the compact geometry of the Fresnel prism array 102, there is a further advantage in that the Fresnel prism array 102 and the bottom optics block 9 can be made in one piece by injection moulding or other thermoforming methods.

Figure 18:
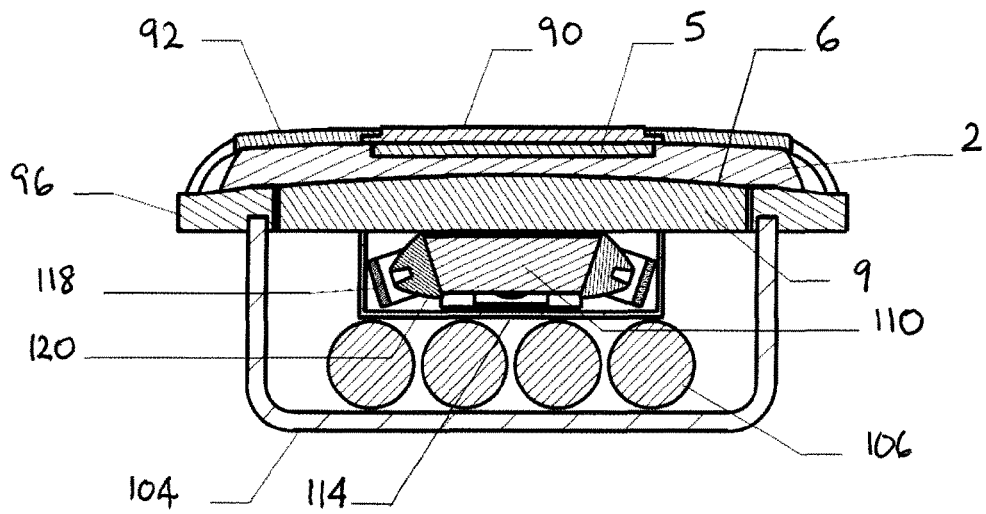
FIG. 18 is a cross section similar to FIG. 16, showing an alternative embodiment of road stud according to the invention, with angled LEDs directed towards a pyramid block.
Figure 19:
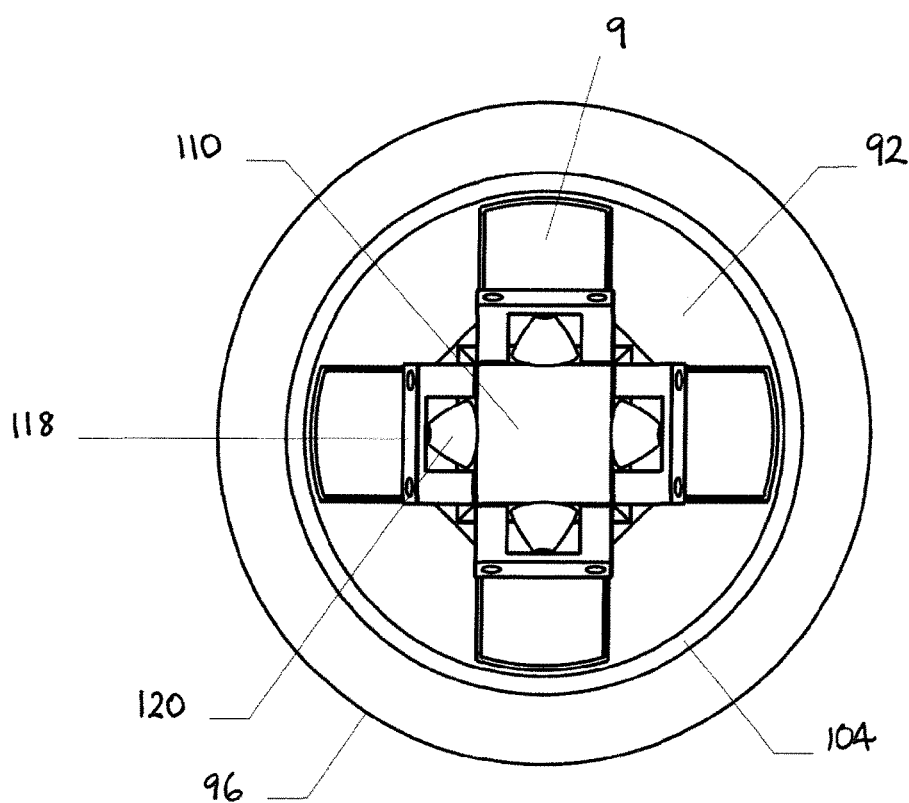
FIG. 19 is a cross sectional view from below of the road stud of FIG. 18.

In FIG. 18, shown in cross-sectional view, and FIG. 19, shown in plan view from below, the construction of the housing is different from the previous embodiments. A metal ring 96 forms a flange that rests on the ground surface around the hole in which the road stud is deployed. A metal cover 92 covers the top (lower refractive) index block 2 and has apertures for each of the lenses 4. Bolts (not shown for clarity) are used to secure the top cover 92 to the ring 96 and, when locked, retain all the optical components securely in place. A housing 104 is secured below the ring 96 to provide a watertight enclosure for the batteries 106.

In this embodiment a pyramidal block 110 made of the same material as the bottom optics block 9 is bonded to the bottom optics block using an index-matched transparent adhesive. Collimators 112 are positioned close to or in optical contact with the angled faces of the pyramidal block 110. Again optical contact is afforded by employing a transparent adhesive. An inner housing 114 holds a PCB upon which LEDs 118 are fixed. The LED light is collimated by a CPC collimator 120, which directs the light through the pyramid block 110 and into the bottom block 9 such that after refraction at the interface 6 light is directed into a lens 4. The lens 4 directs the light onto the road surface. The advantage of this embodiment compared with FIG. 16 is a compact depth so it is useful where depth of metallised road is limited. It is also useful in situations where the water table of the aggregate is not deep as it is preferable to avoid standing water. Only a hole of shallow depth is needed with this arrangement. Air space between collimators 120 and batteries 106 shown in the figure can be reduced.

Figure 20:
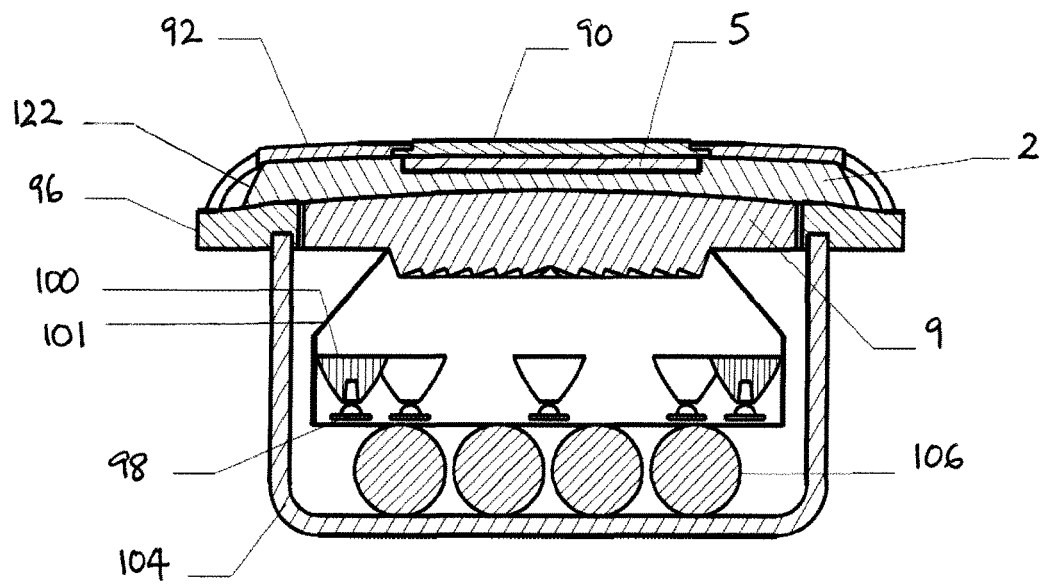
FIG. 20 is a cross section similar to FIG. 16, showing a variant of the road stud that can generate beams in eight directions.
Figure 21:
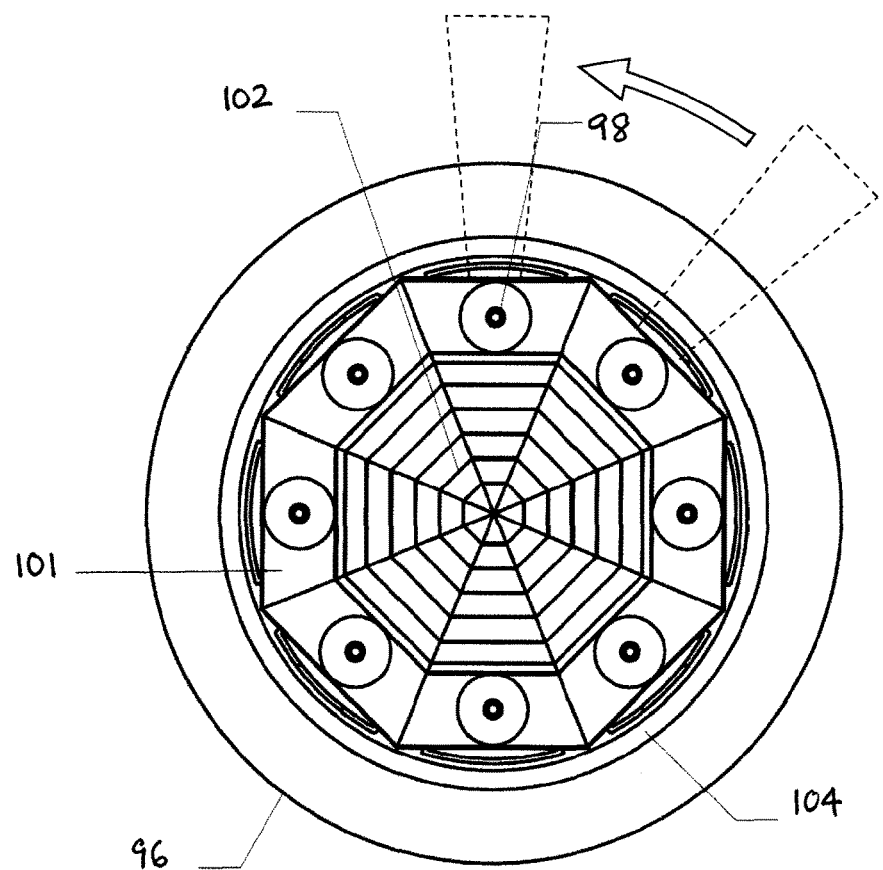
FIG. 21 is a cross sectional view from below of the road stud of FIG. 20.

The embodiment of FIGS. 15 to 17 can be extended to permit illumination by a larger number of LEDs 98. An embodiment with eight LEDs is shown in FIGS. 20 and 21. In this case the bottom and top optics blocks 9,2 are circular in plan view. By sequentially switching on the LEDs 98, horizontal strips of the road surface over an angle of 360 degrees may be illuminated. In this case the lens is formed as a continuous surface 122 around the rim of the top block 2. This rim lens 122 directs and conditions the rays primarily in the vertical plane. Additional conditioning in the horizontal plane (parallel to the road surface) may be afforded by incorporating optical power in the horizontal plane of the reflector facet 101. This would typically be a cylindrical facet radius (horizontal plane) of a few hundred mm. Alternatively the rim 122 of the top block 2 could incorporate an array of lenses with refracting power in the vertical and horizontal planes. In that case the facets of the reflective array 101 would be plane.

Figure 22:
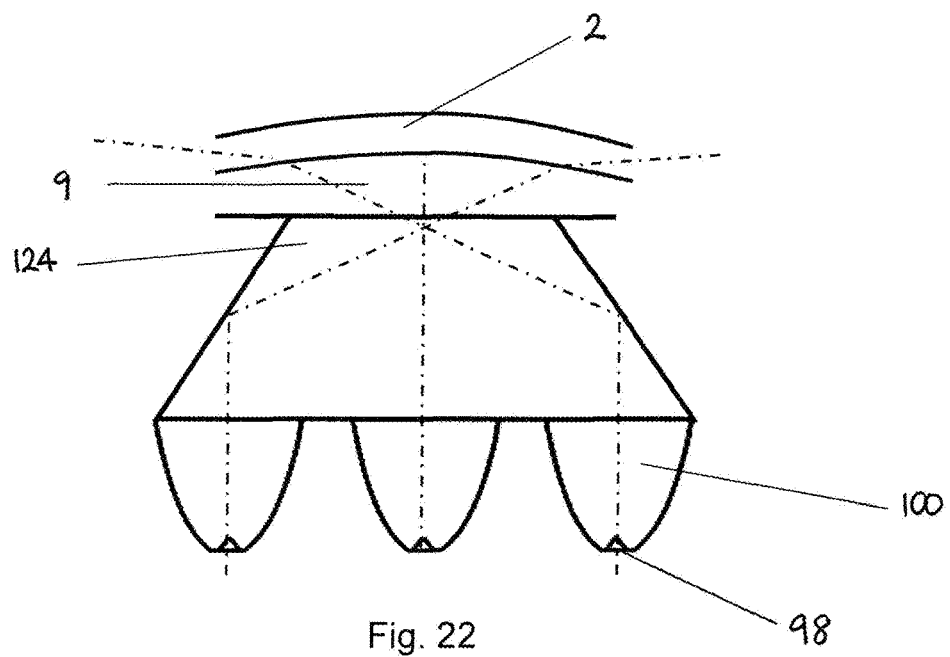
FIG. 22 is a partial cross section on a vertical plane, showing an alternative embodiment of road stud according to the invention, with vertically oriented LEDs directed towards a pyramid block.
Figure 23:
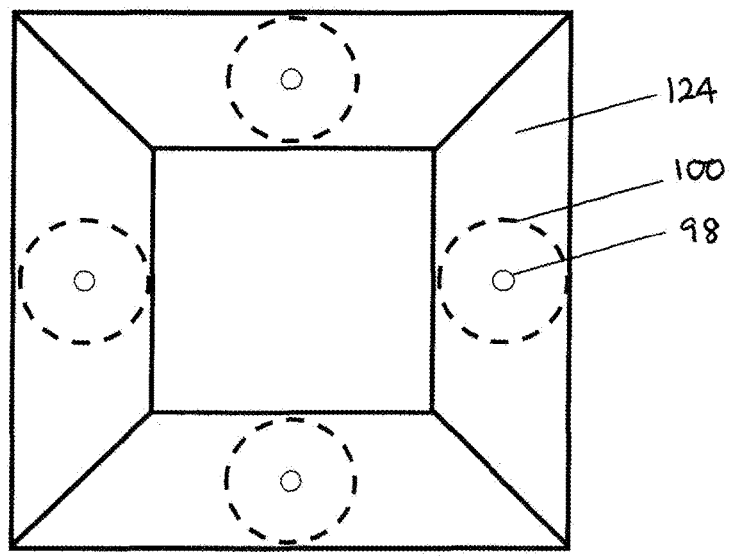
FIG. 23 is a plan view from above of the pyramid block of FIG. 22.
Figure 24:
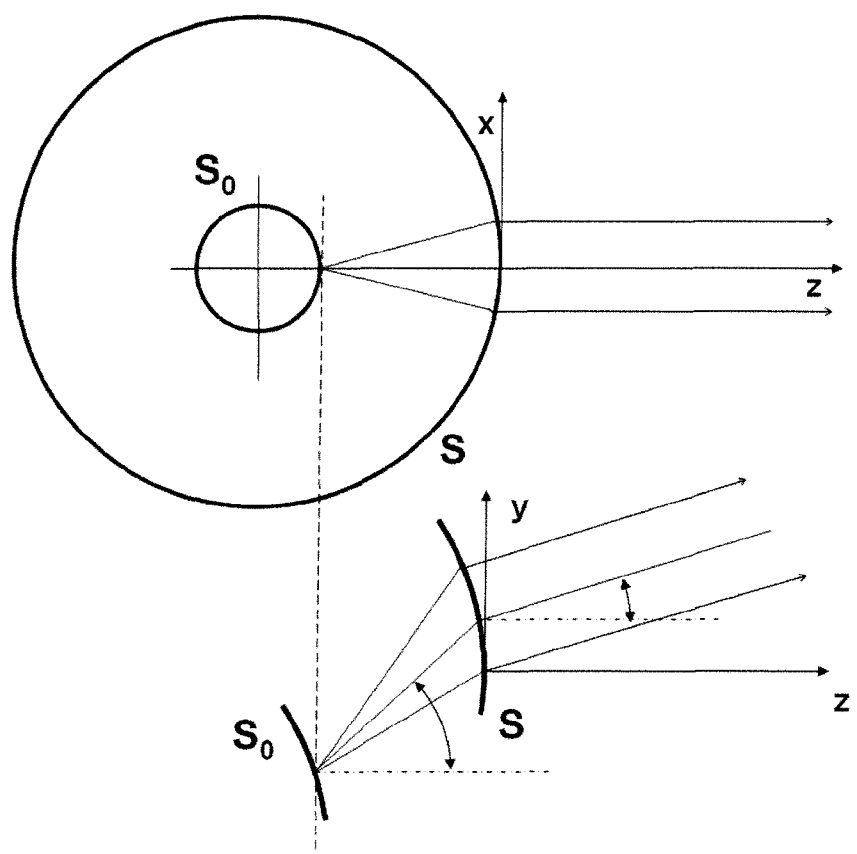
FIGS. 24 to 26 illustrate the application of Coddington theory to the design of optics for use in the present invention.
Figure 25:
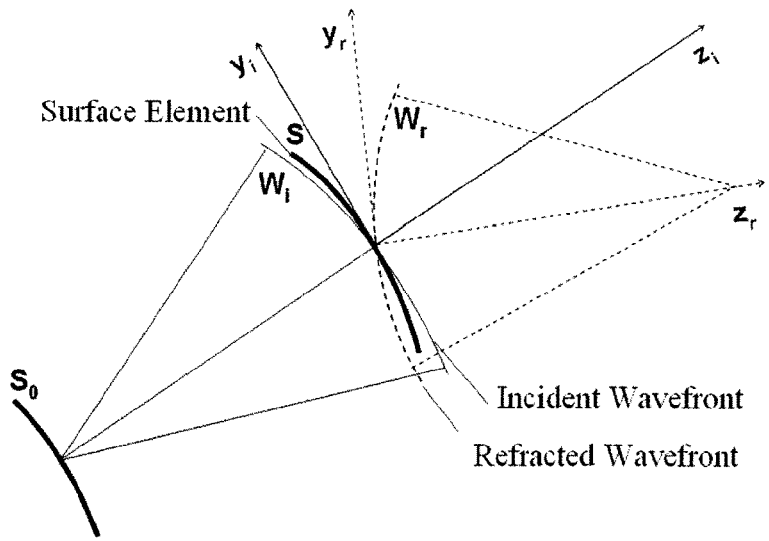
Figure 26:
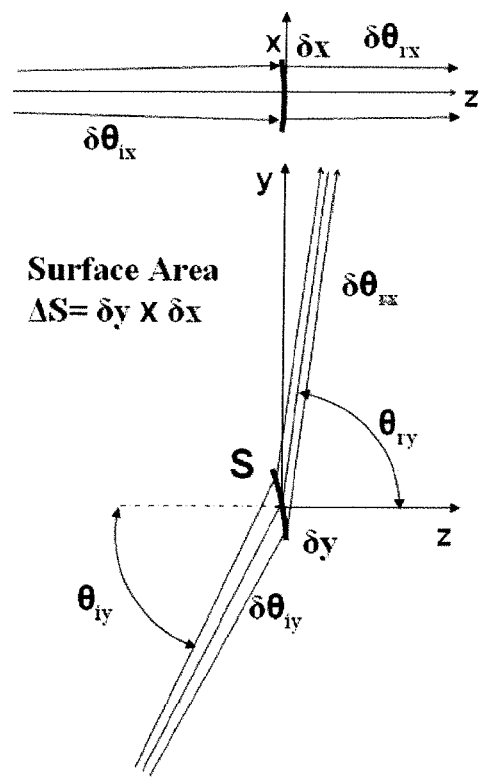

FIGS. 22 and 23 illustrate a further embodiment of the optics for directing the light rays from the LEDs 98 into the bottom block 9. The pyramid block 124 is one piece so as to be injection mouldable in one piece. It is separate to the lower optics block 9 but is made of the same material. It is bonded to the bottom optics block 9 with an adhesive with the same refractive index. This bond effectively makes the pyramid block 124, collimator block 100 and the bottom optics block 9 one piece. The top of the pyramid block 124 directs rays into the lower optics block 9 by total internal reflection at its angled facets. After refraction into the top block 2 the rays are incident on the lens (not shown in FIG. 22) as previously described. Advantages are that the reflective facets operate by T.I.R. so that no surface metallization is needed and also that the LEDs are all on one flat PCB.

The invention claimed is:

1. An illumination system comprising:
a body that defines a receiving plane;
a light source positioned in the body below the receiving plane;
an optics block for transmitting light from the light source to an upper surface of the optics block; and
a top block for transmitting light from a lower surface of the top block to an exterior;
wherein the optics block has a higher refractive index than the top block;
wherein the upper surface of the optics block is in optical contact with the lower surface of the top block, the interface between the upper surface and the lower surface being shaped to refract the light from the source into a beam that rises at a first angle relative to the receiving plane;
wherein the top block comprises a window above the receiving plane, through which the light emerges to the exterior, the window being shaped to refract the light into a beam that descends at a second angle relative to the receiving plane; and
wherein the receiving plane is ground level.

2. The illumination system according to claim 1, wherein the top block is integral with the body.

3. The illumination system according to claim 1, wherein the window of the top block has the shape of part of a toroidal lens.

4. The illumination system according to claim 1, wherein the top block has an upper surface with a domed profile, the window being provided in a recess in the upper surface.

5. The illumination system according to claim 1, further comprising a solar cell below the top block, wherein the optics block further comprises a reflective surface arranged to intercept light that has been reflected from the interface between the optics block and the top block and to re-direct the intercepted light towards the solar cell.

6. The illumination system according to claim 1, further comprising a generally parabolic collimator between the light source and the optics block, wherein the parabolic collimator directs light from the source into a generally vertical beam, the system further comprising a reflective surface arranged to re-direct the light from the collimator obliquely towards the upper surface of the optics block.

7. The illumination system according to claim 6, wherein the top block comprises two of the windows facing in opposite directions and the optics block comprises two of the reflective surfaces arranged to split the light from the collimator into two beams and to redirect the beams obliquely towards the upper surface of the optics block in two directions, ultimately to emerge respectively from the two windows in the top block.

8. The illumination system according to claim 1, comprising a plurality of the light sources, each light source being aligned with a lens to direct light from the source obliquely into the optics block, such that light from different sources ultimately emerges from different windows in the top block.

9. The illumination system according to claim 1, further comprising a Fresnel prism array at the surface where light from the light source enters the optics block, wherein the light enters the optics block through facets of the Fresnel prism array in a direction that is substantially normal to the facets.

10. The illumination system according to claim 1, wherein the top block comprises an insert, the insert having a lower surface that defines the lower surface of the top block and having an upper surface in the form of a Fresnel prism array that abuts a complementary surface of the top block, wherein light passes from the insert into the top block through facets of the Fresnel prism array in a direction that is substantially normal to the facets.

11. The illumination system according to claim 1, wherein the first angle is less than 15 degrees.

12. The illumination system according to claim 11, wherein the first angle is between 5 and 7 degrees.

13. The illumination system according to claim 1, wherein the second angle is less than 5 degrees.

14. The illumination system according to claim 1, further comprising: a primary sensor for sensing the intensity of light that is received by the system from its surroundings; and feedback means responsive to the primary sensor for adjusting the power supply of the light source to maintain the sensed light intensity within a predetermined range.

15. The illumination system according to claim 14, wherein the light source emits pulses of light, and wherein the primary sensor preferentially detects the pulsed light or the feedback means preferentially responds to the pulsed light in order to distinguish ambient light from light that has been emitted by the light source and reflected by surroundings.

16. The illumination system according to claim 14, wherein the primary sensor senses light in a first range of wavelengths; further comprising a secondary sensor for sensing the intensity of light that is received by the system from its surroundings in a second range of wavelengths; and means for comparing signals from the primary and secondary sensors to detect the presence of fog in surroundings surrounding the system.

17. An installation comprising the illumination system according to claim 1 installed on a ground surface and further comprising a reflective marking applied to the ground surface for illumination by the system.

18. The installation according to claim 17, wherein the reflective marking is formed from a phosphorescent material that can be charged by the illumination system.

19. The installation according to claim 18, wherein the reflective marking is formed from a pattern of reflective material, the density of the reflective material being varied with distance from the illumination system to provide a substantially uniform level of reflected light over an area defined by the marking.

20. An illumination system comprising:
a body that defines a receiving plane;
a light source positioned in the body below the receiving plane;
an optics block for transmitting light from the light source to an upper surface of the optics block;
a top block for transmitting light from a lower surface of the top block to the exterior; and
a solar cell below the top block;
wherein the optics block has a higher refractive index than the top block;
wherein the upper surface of the optics block is in optical contact with the lower surface of the top block, the interface between the upper surface and the lower surface being shaped to refract the light from the source into a beam that rises at a first angle relative to the receiving plane;

wherein the top block comprises a window above the receiving plane, through which the light emerges to the exterior, the window being shaped to refract the light into a beam that descends at a second angle relative to the receiving plane; and wherein the optics block further comprises a reflective surface arranged to intercept light that has been reflected from the interface between the optics block and the top block and to re-direct the intercepted light towards the solar cell.

* * * * *